US012731830B2

(12) United States Patent
Liu et al.

(10) Patent No.: US 12,731,830 B2
(45) Date of Patent: Sep. 8, 2026

(54) BATTERY CELL, BATTERY, AND ELECTRIC APPARATUS

(71) Applicant: CONTEMPORARY AMPEREX TECHNOLOGY (HONG KONG) LIMITED, Hong Kong (CN)

(72) Inventors: Liangbin Liu, Ningde (CN); Jiazheng Wang, Ningde (CN); Shengkun Xie, Ningde (CN); Guangjin Wu, Ningde (CN); Zijian Lv, Ningde (CN); Yingwei Su, Ningde (CN); Shuai Xie, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/076,511

(22) Filed: Mar. 11, 2025

(65) Prior Publication Data

US 2025/0337058 A1 Oct. 30, 2025

Related U.S. Application Data

(63) Continuation of application No. PCT/CN2024/111515, filed on Aug. 12, 2024.

(30) Foreign Application Priority Data

Apr. 30, 2024 (CN) ......................... 202410536596.0

(51) Int. Cl.
*H01M 50/107* (2021.01)
*H01M 4/38* (2006.01)
(Continued)

(52) U.S. Cl.
CPC ......... *H01M 50/107* (2021.01); *H01M 4/386* (2013.01); *H01M 50/119* (2021.01);
(Continued)

(58) Field of Classification Search
None
See application file for complete search history.

(56) References Cited

U.S. PATENT DOCUMENTS

2008/0070112 A1* 3/2008 Kogetsu .................. H01M 4/70 429/163
2012/0202101 A1* 8/2012 Ueda .................... H01M 50/119 429/127
(Continued)

FOREIGN PATENT DOCUMENTS

CN 110993901 A 4/2020
CN 111384370 A 7/2020
(Continued)

OTHER PUBLICATIONS

The World Intellectual Property Organization (WIPO) International Search Report for PCT/CN2024/111515 Jan. 21, 2025 6 Pages (including translation).
(Continued)

*Primary Examiner* — Haixia Zhang
(74) *Attorney, Agent, or Firm* — ANOVA LAW GROUP, PLLC

(57) ABSTRACT

A battery cell includes an electrode assembly and a housing. The electrode assembly includes a negative electrode plate, where the negative electrode plate includes a negative electrode current collector and a negative electrode film layer disposed on at least one side of the negative electrode current collector and containing a negative electrode active material. The housing accommodates the electrode assembly, and the housing includes a side wall, where the side wall surrounds the electrode assembly. The negative electrode active material includes element silicon, and the housing is a cylindrical structure.

18 Claims, 8 Drawing Sheets

(51) Int. Cl.

| | |
|---|---|
| ***H01M 50/119*** | (2021.01) |
| *B60L 50/60* | (2019.01) |
| *H01M 4/02* | (2006.01) |

(52) U.S. Cl.
CPC ........ *B60L 50/60* (2019.02); *H01M 2004/021* (2013.01); *H01M 2004/027* (2013.01); *H01M 2220/20* (2013.01)

(56) References Cited

U.S. PATENT DOCUMENTS

| | | | | |
|---|---|---|---|---|
| 2015/0194663 | A1* | 7/2015 | Youm | H01M 10/0567 429/200 |
| 2017/0207433 | A1* | 7/2017 | Hong | H01M 10/0431 |
| 2021/0234148 | A1* | 7/2021 | Wang | H01M 4/387 |
| 2023/0030940 | A1* | 2/2023 | Su | H01M 50/531 |

FOREIGN PATENT DOCUMENTS

| | | | |
|---|---|---|---|
| CN | 217823121 | U | 11/2022 |
| CN | 116417724 | A | 7/2023 |
| CN | 219393529 | U | 7/2023 |
| CN | 117096462 | A | 11/2023 |
| CN | 117374219 | A | 1/2024 |
| CN | 220569788 | U | 3/2024 |
| CN | 117913215 | A | 4/2024 |
| CN | 118472510 | A | 8/2024 |
| EP | 3644334 | A1 | 4/2020 |
| JP | 2013062029 | A | 4/2013 |
| KR | 20090082125 | A | 7/2009 |
| KR | 20150026925 | A | 3/2015 |
| WO | 2023127371 | A1 | 7/2023 |
| WO | 2023236218 | A1 | 12/2023 |

OTHER PUBLICATIONS

The Korean Intellectual Property Office Notice of Submission of Opinion for Application No. 10-2025-7004652 Aug. 14, 2025 13 Pages (including translation).

The European Patent Office (EPO) The Partial Supplementary European Search Report for Application No. 24833400.5 May 18, 2026 15 Pages.

The European Patent Office (EPO) The Extended European Search Report for Application No. 24833400.5, Jul. 7, 2026 17 Pages.

The Japan Patent Office (JPO) Notice of Reasons for Refusal for Application No. 2025-504201 Jul. 7, 2026 8 Pages (including translation).

* cited by examiner

BATTERY CELL, BATTERY, AND ELECTRIC APPARATUS

CROSS-REFERENCE TO RELATED APPLICATIONS

This application is a continuation of International Application No. PCT/CN2024/111515, filed on Aug. 12, 2024, which claims priority to Chinese Patent Application No. 202410536596.0, filed on Apr. 30, 2024 and entitled "BATTERY CELL, BATTERY, AND ELECTRIC APPARATUS", which are incorporated herein by reference in their entirety.

TECHNICAL FIELD

This application relates to the field of rechargeable batteries, and particularly, relates to a battery cell, a battery, and an electric apparatus.

BACKGROUND

Battery cells have characteristics such as high capacity, and thus are widely used in electronic devices such as mobile phones, laptop computers, electric bicycles, electric vehicles, electric aircrafts, electric ships, electric toy cars, electric toy ships, electric toy aircrafts, and electric tools.

With the development of the battery cell field, the requirements for battery performance are gradually increasing. While improving the energy density of battery cells, the use reliability of battery cells has become relatively poor.

SUMMARY

This application provides a battery cell, a battery, and an electric apparatus. In the embodiments of this application, battery cells can have excellent use reliability while energy density of battery cells are improved.

According to a first aspect, an embodiment of this application provides a battery cell. The battery cell includes an electrode assembly and a housing. The electrode assembly includes a negative electrode plate, where the negative electrode plate includes a negative electrode current collector and a negative electrode film layer disposed on at least one side of the negative electrode current collector and containing a negative electrode active material. The housing accommodates the electrode assembly, and the housing includes a side wall, where the side wall surrounds the electrode assembly. The negative electrode active material includes element silicon, and the housing is a cylindrical structure.

Thus, in this embodiment of this application, the battery cell uses the negative electrode active material containing element silicon and the housing of the cylindrical structure. Corresponding to the housing of the cylindrical structure, the electrode assembly is of the cylindrical structure. In a charging process of the battery cell, radial swelling forces of the electrode assembly are the same in all directions, so that the swelling forces of the electrode assembly are evenly distributed, thereby reducing compressive effect on the housing and enhancing the structural stability of the housing. Therefore, this can allow the battery cell to have excellent use reliability while improving energy density of the battery cell.

In some embodiments, a mass percentage of the element silicon in the negative electrode film layer is 1% to 32%. The mass percentage of the element silicon being within the above range helps to enhance the energy density of the battery cell. With cooperation of the cylindrical housing, this helps the battery cell to have relatively small volume swelling, thereby allowing the battery cell to have excellent use reliability.

In some embodiments, a mass percentage of the element silicon in the negative electrode film layer is 2% to 19%. The mass percentage of the element silicon being within the above range, which in cooperation with the cylindrical housing, allows the battery cell to have relatively small volume swelling, thereby allowing the battery cell to have excellent use reliability.

In some embodiments, a mass percentage of the element silicon in the negative electrode film layer is 6% to 13%. The mass percentage of the element silicon being within the above range, which in cooperation with the cylindrical housing, helps the battery cell to have relatively small volume swelling, thereby allowing the battery cell to have excellent use reliability.

In some embodiments, a capacity surface density of the negative electrode plate is greater than or equal to 3.2 $mAh/cm^2$. When the capacity surface density of the negative electrode plate is within the above range, it is conducive to enhancing the energy density of the battery cell.

In some embodiments, a capacity surface density of the negative electrode plate is 3.3 $mAh/cm^2$ to 11.5 $mAh/cm^2$. When the capacity surface density of the negative electrode plate is within the above range, it is conducive to enhancing the energy density of the battery cell.

In some embodiments, a capacity surface density of the negative electrode plate is 3.96 $mAh/cm^2$ to 7.56 $mAh/cm^2$. When the capacity surface density of the negative electrode plate is within the above range, it is conducive to enhancing the energy density of the battery cell.

In some embodiments, a matrix material of the side wall includes steel, and a thickness of the side wall is 0.3 mm to 0.9 mm. When the thickness of the side wall is within the above range, the mechanical strength of the side wall is relatively high and will not be easily deformed. Using the side wall with the silicon-containing negative electrode is more conducive to improving the energy density of the battery cell while providing excellent use reliability for the battery cell.

In some embodiments, the thickness of the side wall is 0.3 mm to 0.55 mm. When the thickness of the side wall is within the above range, using it with the silicon-containing negative electrode is more conducive to improving the energy density of the battery cell while providing excellent use reliability for the battery cell.

In some embodiments, a surface density of the negative electrode film layer is less than or equal to 10.5 $mg/cm^2$; optionally 6 $mg/cm^2$ to 10 $mg/cm^2$. Through the regulation of the surface density of the negative electrode film layer, the energy density and use reliability of the battery cell can be further improved, and it is conducive to improving the cycling performance.

In some embodiments, a porosity of the negative electrode film layer is greater than or equal to 10%, and less than 100%; optionally 20% to 40%. Through the regulation of the porosity of the negative electrode film layer, the energy density and use reliability of the battery cell can be further improved, and it is conducive to improving the cycling performance.

In some embodiments, a compacted density of the negative electrode film layer is less than or equal to 1.75 $g/cm^3$; optionally 1.4 $g/cm^3$ to 1.7 $g/cm^3$. Through the regulation of the compacted density of the negative electrode film layer, the energy density and use reliability of the battery cell can be further improved, and it is conducive to improving the cycling performance.

In some embodiments, the electrode assembly includes a main body, the main body includes a middle region and two end regions arranged along an axial direction of the housing, and the middle region is located between the two end regions; where in a radial direction of the housing, a distance between an outer surface of the middle region and an inner surface of the side wall is greater than a distance between an outer surface of the end region and the inner surface of the side wall.

Thus, in the embodiments of this application, the distance between the outer surface of the end region and the inner surface of the side wall is relatively smaller, and the distance between the outer surface of the middle region and the inner surface of the side wall is relatively larger. This reserves more swelling space for the middle region, effectively reducing the compressive effect of the main body on the side wall and enhancing the use reliability of the cylindrical battery cell.

In some embodiments, in a direction from the end region to the middle region, the distance between the outer surface of the middle region and the inner surface of the side wall first decreases and then increases.

Thus, in the embodiments of this application, the distance between the outer surface of the middle region and the inner surface of the side wall first decreases and then increases, making the gap increase when it gets closer to the axial center of the middle region. This provides more reserved swelling space, further reducing the risk of the middle region compressing the housing and enhancing the use reliability of the cylindrical battery cell.

In some embodiments, the side wall includes a first part and a second part arranged along the axial direction, the first part is opposite to the middle region in the radial direction, the second part protrudes in the radial direction from a surface of the first part facing the main body, and the second part is opposite to the end region in the radial direction.

Thus, in the embodiments of this application, the distance between an inner surface of the first part and an outer surface of the middle region is larger, reserving more swelling space for the middle region. This is conducive to reducing the risk of the middle region compressing the housing and enhancing the use reliability of the cylindrical battery cell.

In some embodiments, in a direction from the middle region to the end region, the distance between the outer surface of the end region and the inner surface of the side wall increases.

Thus, in the embodiments of this application, the distance between the outer surface of the end region and the inner surface of the side wall increases, allowing the reserved swelling space to increase. This helps reduce the risk of the end region compressing the housing and enhances the use reliability of the cylindrical battery cell.

In some embodiments, the second part is configured as two, and the two second parts are respectively located on two sides of the first part along the axial direction.

Thus, in the embodiments of this application, the two end regions of the main body are each provided with a corresponding second part. The cooperation between the end region and the second part helps to reduce the risk of the end region compressing the housing, while the second part also enhances the mechanical strength of the housing and its resistance to deformation, further improving the use reliability of the cylindrical battery cell.

In some embodiments, a size of the first part along the axial direction is 0.4 to 0.98 times a size of the side wall along the axial direction.

Thus, in the embodiments of this application, the size of the first part along the axial direction being within the above range can provide more swelling space for the middle region. This helps further reduce the risk of the middle region compressing the housing and enhances the use reliability of the cylindrical battery cell.

In some embodiments, an outer peripheral surface of the side wall is a cylindrical surface. During the charging process of the cylindrical battery cell, the swelling of the electrode assembly has little or even no effect on the side wall, thereby enhancing the structural stability of the cylindrical battery cell.

In some embodiments, the inner surface of the side wall is an arched surface, and concaves toward a direction leaving the electrode assembly. The arched surface design of the side wall provides more swelling space for the middle region.

In some embodiments, the side wall has a uniform thickness. When the electrode assembly exerts pressure on the side wall, the deformation of the side wall is more moderate, reducing the likelihood of stress concentration problems, thus enhancing the use reliability of the side wall.

In some embodiments, in a direction from one of the two end regions to the other end region, the thickness of the side wall first decreases and then increases. This trend of the side wall thickness first decreasing and then increasing provides more swelling space for the middle region.

In some embodiments, the side wall protrudes in a direction leaving the electrode assembly, making it easier to implement reserving more swelling space for the middle region.

In some embodiments, when a state of charge of the battery cell is 100%, a distance between the outer surface of the middle region and the inner surface of the side wall in the radial direction is a first middle distance; and when the state of charge of the battery cell is 0%, the distance between the outer surface of the middle region and the inner surface of the side wall in the radial direction is a second middle distance; where the first middle distance is less than the second middle distance, and a difference between the first middle distance and the second middle distance is less than or equal to 0.05 mm.

Thus, in the embodiments of this application, when the difference between the first middle distance and the second middle distance is within the above range, the cylindrical battery cell has a small degree of volume swelling in a charging process. This helps enhance the structural stability and improve the use reliability of the cylindrical battery cell.

In some embodiments, when the state of charge of the battery cell is 100%, a distance between the outer surface of the end region and the inner surface of the side wall in the radial direction is a first end distance; and when the state of charge of the battery cell is 0%, the distance between the outer surface of the end region and the inner surface of the side wall in the radial direction is a second end distance; where the first end distance is less than the second end distance, and a difference between the first end distance and the second end distance is less than or equal to 0.05 mm.

Thus, in the embodiments of this application, when the difference between the first end distance and the second end distance is within the above range, the cylindrical battery cell has a small degree of volume swelling in a charging process. This helps enhance the structural stability and improve the use reliability of the cylindrical battery cell.

In some embodiments, when a state of charge of the battery cell is 100%, a distance between the outer surface of the middle region and the inner surface of the side wall in the radial direction is a first middle distance; and when the state of charge of the battery cell is 0%, the distance between the outer surface of the middle region and the inner surface of the side wall in the radial direction is the second middle distance, and an absolute value of the difference between the first middle distance and the second middle distance is a middle variable; when the state of charge of the battery cell is 100%, a distance between the outer surface of the end region and the inner surface of the side wall in the radial direction is a first end distance; and when the state of charge of the battery cell is 0%, the distance between the outer surface of the end region and the inner surface of the side wall in the radial direction is the second end distance, and an absolute value of the difference between the first end distance and the second end distance is an end variable; where an absolute value of a difference between the middle variable and the end variable is less than or equal to 0.05 mm.

Thus, in the embodiments of this application, when the absolute value of the difference between the middle variable and the end variable is within the above range, the difference in volume swelling between the end region and the middle region of the cylindrical battery cell in the charging process is small, which enables a small overall volume swelling difference in the main body, reducing the likelihood of local excessive compression of the housing, and significantly enhancing the use reliability of the cylindrical battery cell.

In some embodiments, a size of the housing along the axial direction of the housing is 1.3 to 2.5 times a size of the housing along the radial direction of the housing.

Thus, in the embodiments of this application, when the housing meets the above size requirements, in cooperation with that the distance between the outer surface of the middle region and the inner surface of the side wall is greater than the distance between the outer surface of the end region and the inner surface of the side wall, higher structural stability of the housing is ensured, enhancing the use reliability of the cylindrical battery cell.

In some embodiments, a size of the housing along the axial direction of the housing is 50 mm to 150 mm.

In some embodiments, a size of the housing along the radial direction of the housing is 40 mm to 80 mm.

In some embodiments, the housing includes a housing body and an end cover, where the housing body includes the side wall and an end wall that are integrally formed, the end wall and the end cover are opposite in the axial direction of the housing, and the end cover is sealingly connected to the side wall.

In some embodiments, the electrode assembly includes a first tab and a second tab with opposite polarities, the first tab and the second tab both protruding from the main body; and the battery cell further includes an electrode terminal disposed on and insulated from the end wall, the electrode terminal being electrically connected to the second tab, and the end wall being electrically connected to the first tab.

According to a second aspect, an embodiment of this application further proposes a battery, the battery including the battery cell according to any one of the embodiments of the first aspect of this application.

According to a third aspect, an embodiment of this application further proposes an electric apparatus, including the battery according to any one of the embodiments of the second aspect of this application.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

Figure 1:
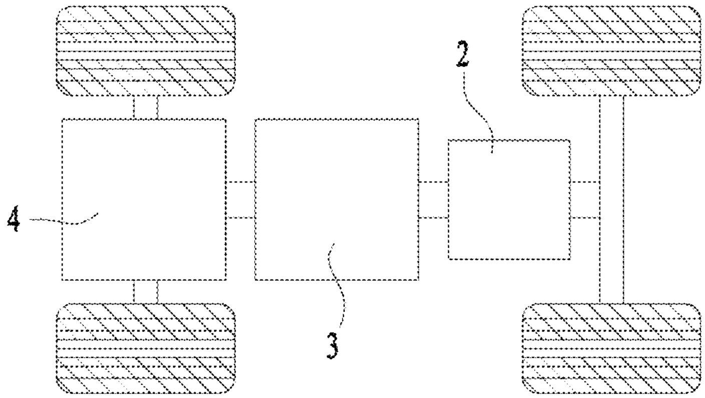
FIG. 1 is a schematic structural diagram of a vehicle according to some embodiments of this application.

The figures are not necessarily drawn to scale.

REFERENCE SIGNS

X. axial direction; Y radial direction;

1. vehicle; 2. battery; 3. controller; 4. motor; 5. box; 5*a*. first box portion; 5*b*. second box portion; 5*c*. accommodating space; 6. battery module; 7. battery cell;

10. electrode assembly; 111. first tab; 112. second tab; 12. main body; 121. middle region; 122. end region; 122*a*. end surface; 12*a*. outer surface;

20. housing; 21. housing body; 211. end wall; 212. side wall; 2121. first part; 2122. second part; 212*a*. outer peripheral surface; 212*b*. inner surface;

22. end cover;

30. electrode terminal; and

40. current collecting member.

DESCRIPTION OF EMBODIMENTS

Embodiments that specifically disclose a battery cell, a battery, and an electric apparatus in this application are described in detail below with reference to the accompanying drawings as appropriate. However, there may be cases where unnecessary detailed descriptions are omitted. For example, detailed descriptions of well-known matters and repeated descriptions of actually identical structures have been omitted. This is to avoid unnecessarily prolonging the following description, for ease of understanding by persons skilled in the art. In addition, the accompanying drawings and the following descriptions are provided for persons skilled in the art to fully understand this application and are not intended to limit the subject matter recorded in the claims.

"Ranges" disclosed in this application are defined in the form of lower and upper limits. A given range is defined by one lower limit and one upper limit selected, where the selected lower and upper limits define boundaries of that particular range. Ranges defined in this method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if minimum values of a range are given as 1 and 2, and maximum values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0-5" means that all real numbers in the range of "0-5" are listed herein, and "0-5" is just a short representation of a combination of these values. In addition, a parameter expressed as an integer greater than or equal to 2 is equivalent to disclosure that the parameter is, for example, an integer among 2, 3, 4, 5, 6, 7, 8, 9, 10, 11, 12, and so on.

Unless otherwise specified, all the embodiments and optional embodiments of this application can be combined with each other to form new technical solutions.

Unless otherwise specified, all the technical features and optional technical features of this application can be combined with each other to form new technical solutions.

Unless otherwise specified, all the steps in this application can be performed in the order described or in random order, in some embodiments, in the order described. For example, a method including steps (a) and (b) indicates that the method may include steps (a) and (b) performed in order or may include steps (b) and (a) performed in order. For example, the above-mentioned method may further include step (c), which indicates that step (c) may be added to the method in any ordinal position, for example, the method may include steps (a), (b), and (c), steps (a), (c), and (b), steps (c), (a), and (b), or the like.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments.

In the description of this application, it should be noted that unless otherwise specified and defined explicitly, the terms "mount", "connect", "join", and "attach" should be understood in their general senses. For example, they may refer to a fixed connection, a detachable connection, or an integral connection, and may refer to a direct connection, an indirect connection via an intermediate medium, or an internal communication between two elements. Persons of ordinary skills in the art can understand specific meanings of these terms in this application as appropriate to specific situations.

The term "and/or" in this application is only an associative relationship for describing associated objects, indicating that three relationships may be present. For example, A and/or B may indicate the following three cases: presence of only A; presence of both A and B; and presence of only B. In addition, the character "/" in this application generally indicates an "or" relationship between contextually associated objects. In this disclosure, the phrases "at least one of A, B, and C" and "at least one of A, B, or C" both mean only A, only B, only C, or any combination of A, B, and C.

In the embodiments of this application, like reference signs denote like components, and for brevity, in different embodiments, detailed descriptions of like components are not repeated. It should be understood that, as shown in the accompanying drawings, sizes such as thickness, length, and width of various components and sizes such as thickness, length, and width of integrated devices in the embodiments of this application are merely for illustrative purposes and should not constitute any limitations on this application.

In this application, a "plurality of" means more than two (inclusive). A secondary is a battery that can be charged after being discharged to activate active materials for continuous use.

The battery cells may include but are not limited to lithium-ion battery cells, sodium-ion battery cells, sodium-lithium-ion battery cells, lithium metal battery cells, sodium metal battery cells, lithium-sulfur battery cells, magnesium-ion battery cells, nickel-metal hydride battery cells, nickel-cadmium battery cells, lead-acid battery cells, and the like.

In an example, the battery cell may be a cylindrical battery cell. The cylindrical battery cell refers to a battery cell that presents a cylindrical structure or a structure similar to a cylindrical shape.

The battery mentioned in the embodiments of this application is a single physical module that includes one or more battery cells for providing a higher voltage and capacity.

In some embodiments, the battery may be a battery module. When there are multiple battery cells, the multiple battery cells are arranged and fixed to form one battery module.

In some embodiments, the battery may be a battery pack. The battery pack includes a box and battery cells, with the battery cells or battery modules accommodated within the box.

In some embodiments, the box may be used as part of the chassis structure of a vehicle. For example, part of the box may become at least part of the chassis of a vehicle, or part of the box may become at least parts of a cross beam and longitudinal beam of a vehicle.

In some embodiments, the battery may be an energy storage apparatus. The energy storage apparatus includes an energy storage container, an energy storage electric cabinet, and the like.

With the development of the battery field, the requirements for the energy density of batteries are gradually increasing. Compared to the carbon material, silicon has a relatively higher theoretical specific capacity, and using silicon-containing negative electrodes has undoubtedly become an effective way to enhance energy density. However, during the charging process of the battery cell, volume swelling of silicon is significant, which may cause deformation or even rupture of the housing of the battery cell, limiting the application of silicon and resulting in poor use reliability of the battery cell.

In view of this, an embodiment of this application proposes a battery cell. The battery cell uses the negative electrode active material containing element silicon and the housing of the cylindrical structure. Corresponding to the housing of the cylindrical structure, the electrode assembly is of the cylindrical structure. In a charging process of the battery cell, radial swelling forces of the electrode assembly are the same in all directions, so that the swelling forces of the electrode assembly are evenly distributed, thereby reducing compressive effect on the housing and enhancing the structural stability of the housing. Therefore, this can allow the battery cell to have excellent use reliability while improving energy density of the battery cell.

The battery cell described in the embodiments of this application is applicable to batteries and electric apparatuses using a battery.

FIG. 1 is a schematic structural diagram of a vehicle according to some embodiments of this application.

As shown in FIG. 1, the vehicle 1 is provided with a battery 2 inside, and the battery 2 may be disposed at the bottom or in the front or at the rear of the vehicle 1. The battery 2 may be configured to supply power to the vehicle 1. For example, the battery 2 may be used as an operational power source for the vehicle 1.

The vehicle 1 may further include a controller 3 and a motor 4, where the controller 3 is configured to control the battery 2 to supply power to the motor 4, for example, to satisfy a working electricity need during start, navigation, and driving of the vehicle 1.

In some embodiments of this application, the battery 2 can be used as not only the operational power source for the vehicle 1 but also a driving power source for the vehicle 1, replacing or partially replacing fossil fuel or natural gas to provide driving traction for the vehicle 1.

Figure 2:
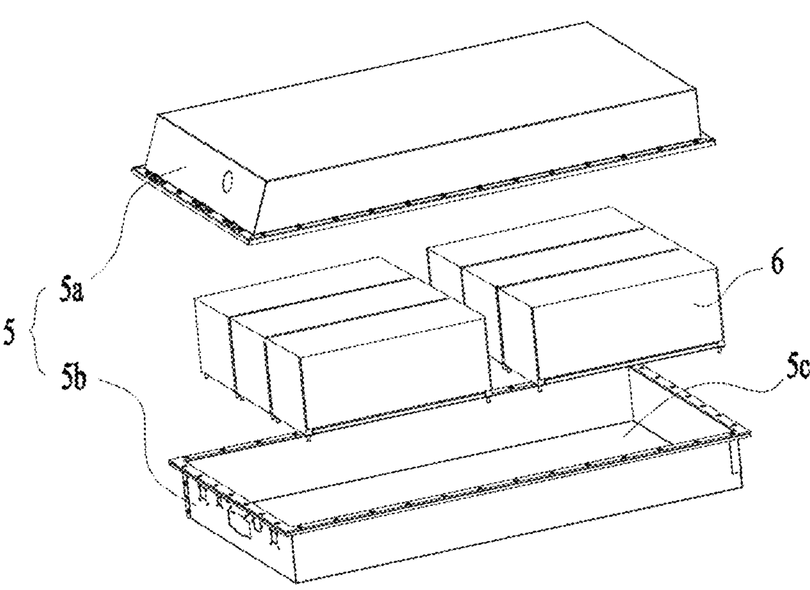
FIG. 2 is a schematic exploded view of a battery according to some embodiments of this application.

FIG. 2 is a schematic exploded view of a battery according to some embodiments of this application. As shown in FIG. 2, the battery 2 includes a box 5 and a cylindrical battery cell (not shown in FIG. 2), and the cylindrical battery cell is accommodated in the box 5.

The box 5 is configured to accommodate the cylindrical battery cell, and the box 5 may have various structures. In some embodiments, the box 5 may include a first box portion 5*a* and a second box portion 5*b*. The first box portion 5*a* and the second box portion 5*b* fit together to jointly define an accommodating space 5*c* for accommodating the cylindrical battery cell. The second box portion 5*b* may be a hollow structure with an opening formed at an end, the first box portion 5*a* is a plate-shaped structure, and the first box portion 5*a* covers the opening side of the second box portion 5*b* so as to form the box 5 having the accommodating space 5*c*; and the first box portion 5*a* and the second box portion 5*b* may alternatively both be a hollow structure with an opening formed at an end, and the opening side of the first box portion 5*a* is engaged with the opening side of the second box portion 5*b* so as to form the box 5 having the accommodating space 5*c*. Certainly, the first box portion 5*a* and the second box portion 5*b* may be in various shapes, such as cylinder and cuboid.

In order to improve the airtightness after the connection of the first box portion 5*a* and the second box portion 5*b*, a sealing element such as sealing gum and sealing ring may also be disposed between the first box portion 5*a* and the second box portion 5*b*.

Assuming that the first box portion 5*a* fits on a top of the second box portion 5*b*, the first box portion 5*a* may also be referred to as an upper cover, and the second box portion 5*b* may also be referred to as a lower box.

There may be one or more cylindrical battery cells in the battery 2. Under the condition that a plurality of cylindrical battery cells are provided, the plurality of cylindrical battery cells may be connected in series, parallel, or series-parallel, where being connected in series-parallel means a combination of series and parallel connections of the plurality of cylindrical battery cells. The plurality of cylindrical battery cells may be directly connected in series, parallel, or series-parallel, and then an entirety of the plurality of cylindrical battery cells is accommodated in the box 5; or certainly, a plurality of cylindrical battery cells are first connected in series, parallel, or series-parallel first to form a battery module 6 and then a plurality of battery modules 6 are connected in series, parallel, or series-parallel to form an entirety, which is accommodated in the box 5.

The battery cell refers to a smallest unit constituting a battery.

Figures 3, 4:
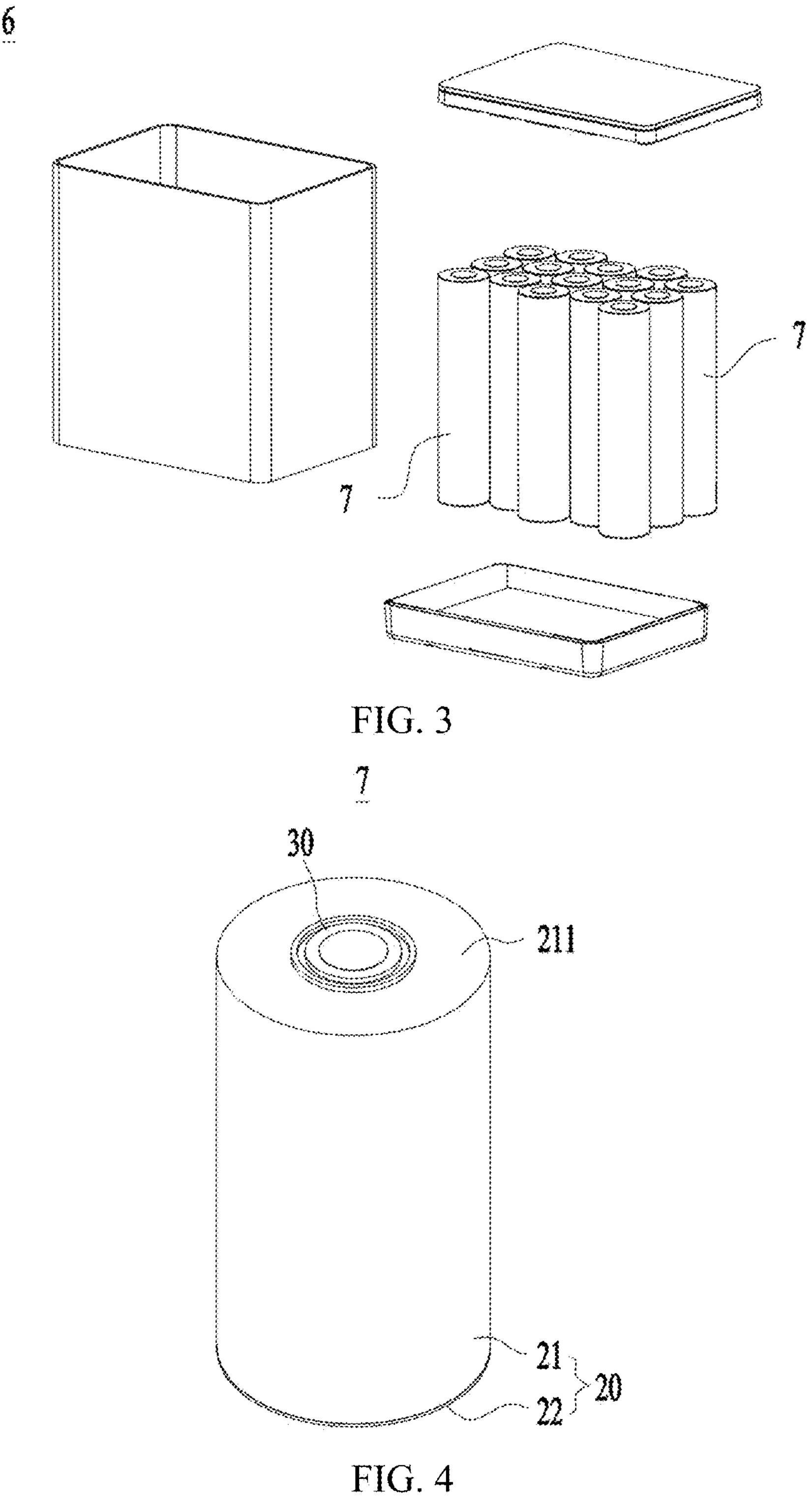
FIG. 3 is a schematic exploded view of a battery module shown in FIG. 2.
FIG. 4 is a schematic structural diagram of a battery cell according to some embodiments of this application.

FIG. 3 is a schematic structural diagram of a battery module shown in FIG. 2.

In some embodiments, as shown in FIG. 3, there are a plurality of battery cells 7, and the plurality of battery cells 7 are connected in series, parallel, or series-parallel to form a battery module 6. A plurality of battery modules 6 are then connected in series, parallel, or series-parallel to form an entirety which is accommodated in the box.

The plurality of battery cells 7 in the battery module 6 may be electrically connected via a busbar 8, so that the plurality of battery cells 7 in the battery module are connected in series, parallel, or series-parallel. There may be one or more busbars, and each busbar is configured to electrically connect at least two cylindrical battery cells.

Figure 5:
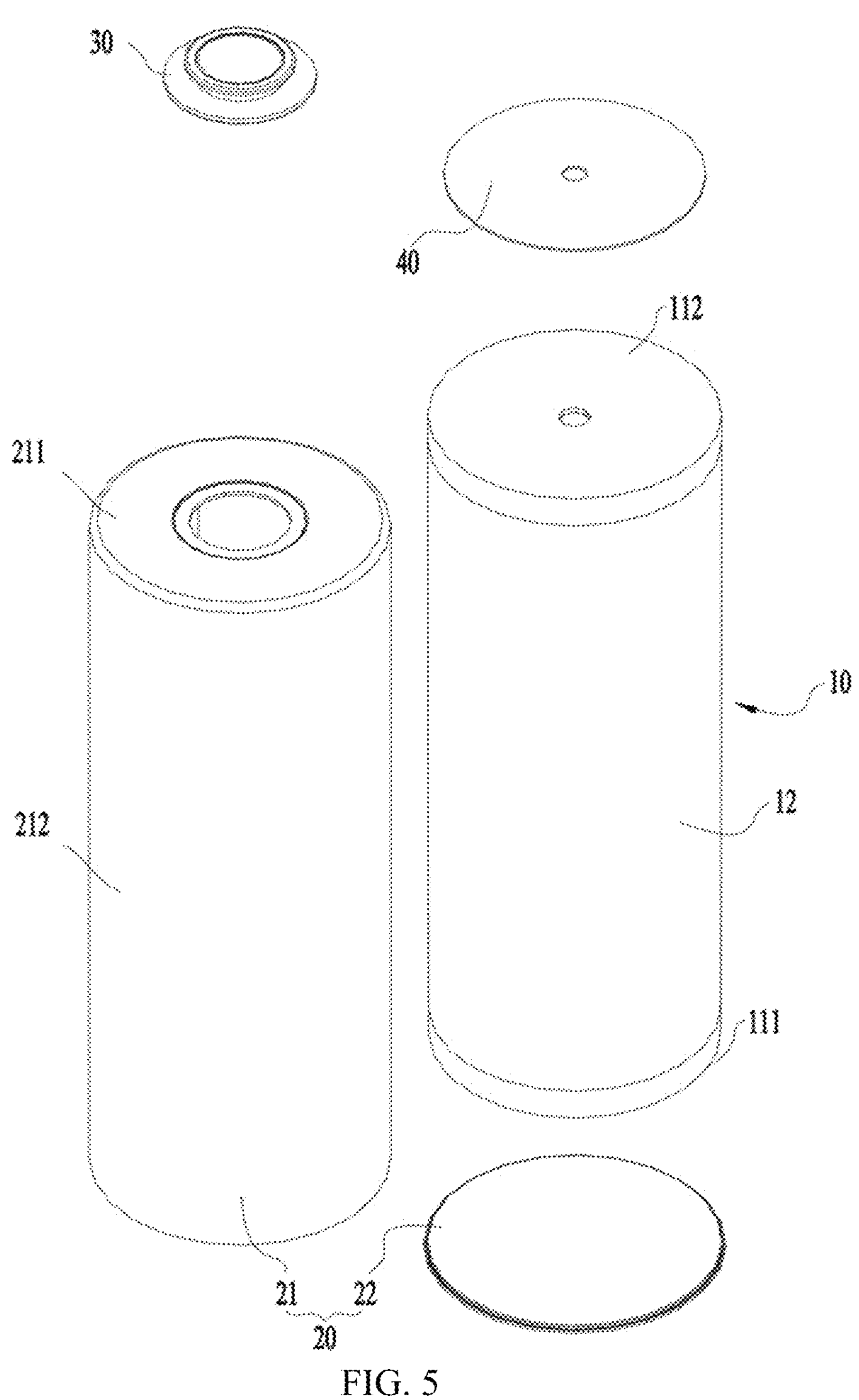
FIG. 5 is a schematic exploded view of a battery cell according to some embodiments of this application.

FIG. 4 is a schematic structural diagram of a cylindrical battery cell according to some embodiments of this application; and FIG. 5 is a schematic exploded view of the cylindrical battery cell shown in FIG. 4.

As shown in FIG. 4 and FIG. 5, in some embodiments, the battery cell 7 includes an electrode assembly 10 and a housing 20, and the electrode assembly 10 is accommodated in the housing 20.

The housing 20 is a cylindrical structure. The housing 20 includes a housing body 21. The housing body 21 is a cylindrical structure, and the shape of a corresponding electrode assembly 10 is also a cylindrical structure. The axial direction of the housing 20 is parallel to the axial direction of the electrode assembly 10, and the radial direction of the housing 20 is parallel to the radial direction of the electrode assembly 10.

In some embodiments, a size of the housing 20 along the axial direction is 1.3 to 2.5 times a size of the housing 20 along the radial direction, for example, 1.3 times, 1.4 times, 1.5 times, 1.6 times, 1.7 times, 1.8 times, 1.9 times, 2.0 times, 2.1 times, 2.2 times, 2.3 times, 2.4 times, or 2.5 times, or a range defined by any two of the foregoing values. When the housing 20 meets the above size requirements, and is used with the element silicon-containing negative electrode plate of the battery cell 7, the housing 20 can effectively constrain the electrode assembly 10, reduce the overall volume swelling of the battery cell 7, and improve the use reliability of the cylindrical battery cell.

For example, a size of the housing 20 along the axial direction is 50 mm to 150 mm, for example, 50 mm, 55 mm, 60 mm, 65 mm, 70 mm, 75 mm, 80 mm, 85 mm, 90 mm, 95 mm, 100 mm, 105 mm, 110 mm, 115 mm, 120 mm, 125 mm, 130 mm, 135 mm, 140 mm, 145 mm, or 150 mm, or a range defined by any two of the foregoing values.

For example, a size of the housing 20 along the radial direction is 40 mm to 80 mm, such as 40 mm, 45 mm, 50 mm, 55 mm, 60 mm, 65 mm, 70 mm, 75 mm, or 80 mm, or a range defined by any two of the foregoing values.

The electrode assembly 10 includes a positive electrode and a negative electrode. During the charge and discharge of the battery cell 7, active ions (for example, lithium ions) are intercalated and deintercalated back and forth between the positive electrode and the negative electrode. Optionally, the electrode assembly 10 further includes a separator disposed between the positive electrode and the negative electrode. The separator can reduce the risk of short circuit between the positive electrode and negative electrode while allowing active ions to pass through.

The electrode assembly 10 includes a positive electrode and a negative electrode. During the charge and discharge of the battery cell 7, active ions (for example, lithium ions) are intercalated and deintercalated back and forth between the positive electrode and the negative electrode. Optionally, the electrode assembly 10 further includes a separator disposed between the positive electrode and the negative electrode. The separator can reduce the risk of short circuit between the positive electrode and negative electrode while allowing active ions to pass through.

In some embodiments, the positive electrode may be a positive electrode plate. The positive electrode plate may include a positive electrode current collector and a positive electrode film layer disposed on at least one surface of the positive electrode current collector. The positive electrode film layer includes a positive electrode active material.

In an example, the positive electrode current collector has two opposite surfaces in its thickness direction, and the positive electrode film layer is disposed on either or both of the two opposite surfaces of the positive electrode current collector.

In an example, the positive electrode current collector may be a metal foil current collector or a composite current collector. For example, as the metal foil, stainless steel, copper, aluminum, nickel, carbon electrode, carbon, nickel, titanium, aluminum or stainless steel surface-treated with silver, or the like can be used. The composite current collector may include a polymer material matrix and a metal layer. The composite current collector may be formed by forming a metal material (aluminum, aluminum alloy, nickel, nickel alloy, titanium, titanium alloy, silver, silver alloy, or the like) on a polymer material matrix (matrices such as polypropylene, polyethylene terephthalate, polybutylene terephthalate, polystyrene, or polyethylene).

In an example, when the battery cell 7 in the embodiments of this application is a lithium-ion battery, the positive electrode active material may include at least one of the following materials: phosphate, layered transition metal oxide and respective modified compounds thereof. Alternatively, the positive electrode active material may include layered transition metal oxides and respective modified compounds thereof, which is conducive to increasing the energy density of the battery cell 7. However, this application is not limited to such materials, and may alternatively use other conventional materials that can be used as positive electrode film layers for batteries instead. One type of these positive electrode active materials may be used alone, or two or more of them may be used in combination.

Examples of the phosphate may include but are not limited to at least one of lithium iron phosphate (for example, $LiFePO_4$ (LFP for short)), a composite material of lithium iron phosphate and carbon, lithium manganese phosphate (for example, $LiMnPO_4$), a composite material of lithium manganese phosphate and carbon, lithium manganese iron phosphate, and a composite material of lithium manganese iron phosphate and carbon.

The layered transition metal oxide includes at least one of a compound with a general formula $Li_aNi_bCo_cM_dO_eA_f$ and modified compounds thereof, where $0.8 \le a \le 1.2$, $0.5 \le b < 1$, $0 < c < 1$, $0 < d < 1$, $1 \le e \le 2$, $0 \le f \le 1$, M includes at least one of Mn, Al, Zr, Zn, Cu, Cr, Mg, Fe, V, Ti, and B, and A includes at least one of N, F, S, and Cl.

Examples of the layered transition metal oxide may include but are not limited to at least one of lithium cobalt oxide (for example, $LiCoO_2$), lithium nickel oxide (for example, $LiNiO_2$), lithium manganese oxide (for example, $LiMnO_2$ and $LiMn_2O_4$), lithium nickel cobalt oxide, lithium manganese cobalt oxide, lithium nickel manganese oxide, lithium nickel cobalt manganese oxide (for example, $LiNi_{1/3}Co_{1/3}Mn_{1/3}O_2$ (NCM333 for short), $LiNi_{0.5}Co_{0.2}Mn_{0.3}O_2$ (NCM523 for short), $LiNi_{0.5}Co_{0.25}Mn_{0.25}O_2$ (NCM211 for short), $LiNi_{0.6}Co_{0.2}Mn_{0.2}O_2$ (NCM622 for short), and $LiNi_{0.8}Co_{0.1}Mn_{0.1}O_2$ (NCM811 for short)), lithium nickel cobalt aluminum oxide (for example, $LiNi_{0.80}Co_{0.15}Al_{0.05}O_2$), and modified compounds thereof.

When the battery cell 7 in the embodiments of this application is a sodium-ion battery, the positive electrode active material may include but is not limited to at least one of sodium-containing transition metal oxide, a polyanionic material (such as phosphate, fluorophosphate, pyrophosphate, and sulfate), and a Prussian blue material.

In an example, the positive electrode active material for sodium-ion batteries may include at least one of $NaFeO_2$, $NaCoO_2$, $NaCrO_2$, $NaMnO_2$, $NaNiO_2$, $NaNi_{1/2}Ti_{1/2}O_2$, $NaNi_{1/2}Mn_{1/2}O_2$, $Na_{2/3}Fe_{1/3}Mn_{2/3}O_2$, $NaNi_{1/3}Co_{1/3}Mn_{1/3}O_2$, $NaFePO_4$, $NaMnPO_4$, $NaCoPO_4$, a Prussian blue material, and a material with a general formula $X_pM'_q(PO_4)_rO_xY_{3-x}$. In the general formula $X_pM'_q(PO_4)_rO_xY_{3-x}$, $0<p \le 4$, $0<q \le 2$, $1 \le r \le 3$, $0 \le x \le 2$, X includes at least one of $H^+$, $Li^+$, $Na^+$, $K^+$, and $NH_4^+$, M' is a transition metal cation, and optionally at least one of V, Ti, Mn, Fe, Co, Ni, Cu, and Zn, and Y is a halogen anion, and optionally at least one of F, Cl, and Br.

In the embodiments of this application, the modified compounds of the foregoing positive electrode active materials may be obtained by doping modification and/or surface coating modification to the positive electrode active material, such as carbon coating modification and fast ion conductor coating modification.

The charging and discharging of the battery cell 7 are accompanied by deintercalation and consumption of active ions such as Li, and the battery cell 7 has a different molar concentration of Li when discharged to a different state. In the examples of positive electrode active materials in the embodiments of this application, the molar concentration of Li refers to an initial state of the material, that is, the state before feeding. When the positive electrode active material is applied to the battery system, the molar concentration of Li may change after charge and discharge cycles.

In the examples of positive electrode active materials in the embodiments of this application, the molar concentration of oxygen O is only a theoretical state value, and lattice oxygen release causes changes in the molar concentration of oxygen O. In reality, the molar concentration of oxygen O fluctuates.

In some embodiments, the positive electrode can use foam metal. The foam metal may be nickel foam, copper foam, aluminum foam, alloy foam, carbon foam, or the like. When foam metal is used as the positive electrode, the positive electrode film layer may be not provided on the surface of the foam metal, and certainly, the positive electrode film layer may alternatively be provided on the surface of the foam metal. In an example, the foam metal may alternatively be filled and/or deposited with a lithium source material, potassium metal, or sodium metal, where the lithium source material may be a lithium metal and/or a lithium-rich material.

In some embodiments, the positive electrode film layer further optionally includes a positive electrode conductive agent. The positive electrode conductive agent is not particularly limited in type in the embodiments of this application. In an example, the positive electrode conductive agent includes at least one of superconducting carbon, conductive graphite, acetylene black, carbon black, Ketjen black, carbon dots, carbon nanotubes, graphene, and carbon nanofibers. In some embodiments, a mass percentage of the positive electrode conductive agent in the positive electrode film layer is ≤5 wt %.

In some embodiments, the positive electrode film layer further optionally includes a positive electrode binder. The positive electrode binder is not particularly limited in type in the embodiments of this application. In an example, the positive electrode binder may include at least one of polyvinylidene fluoride (PVDF), polytetrafluoroethylene (PTFE), vinylidene fluoride-tetrafluoroethylene-propylene terpolymers, vinylidene fluoride-hexafluoropropylene-tetrafluoroethylene terpolymers, tetrafluoroethylene-hexafluoropropylene copolymers, and fluorine-containing acrylic resins. In some embodiments, a mass percentage of the positive electrode binder in the positive electrode film layer is ≤5 wt %.

The positive electrode film layer is typically formed by applying a positive electrode slurry onto the positive electrode current collector, followed by drying and cold pressing. The positive electrode slurry is typically formed by dispersing the positive electrode active material, the optional conductive agent, the optional binder, and any other components in a solvent and stirring them to uniformity. The solvent may be but is not limited to N-methylpyrrolidone (NMP).

In some embodiments, the negative electrode may be a negative electrode plate. The negative electrode plate may include a negative electrode current collector and a negative electrode film layer disposed on at least one surface of the negative electrode current collector. The negative electrode film layer includes a negative electrode active material.

In an example, the negative electrode current collector includes two opposite surfaces in its thickness direction, and the negative electrode film layer is disposed on either or both of the two opposite surfaces of the negative electrode current collector.

In an example, the negative electrode current collector may be a metal foil, foam metal, or composite current collector. For example, as the metal foil, the negative electrode current collector may use silver surface-treated aluminum or stainless steel, stainless steel, copper, aluminum, nickel, baked carbon, carbon, nickel, or titanium. The foam metal may be nickel foam, copper foam, aluminum foam, alloy foam, carbon foam, or the like. The composite current collector may include a polymer material matrix and a metal layer. The composite current collector may be formed by forming a metal material (copper, copper alloy, nickel, nickel alloy, titanium, titanium alloy, silver, silver alloy, or the like) on a polymer material matrix (for example, a matrix of polypropylene, polyethylene terephthalate, polybutylene terephthalate, polystyrene, or polyethylene).

In an example, the negative electrode active material may be a negative electrode active material well known in the art and used for the battery cell 7. In an example, the negative electrode active material may include at least one of the following materials: a carbon material (for example, the carbon material includes at least one of artificial graphite, natural graphite, soft carbon, hard carbon), a silicon-based material, a tin-based material, lithium titanate, and the like. The silicon-based material may include at least one of elemental silicon, a silicon-oxygen compound, a silicon-carbon composite, a silicon-nitrogen composite, and a silicon alloy. The tin-based material may include at least one of elemental tin, a tin-oxygen compound, and a tin alloy. However, this application is not limited to such materials, and may alternatively use other conventional materials that can be used for the negative electrode film layer of the battery. One of these negative electrode film layers may be used alone, or two or more of them may be used in combination.

In some embodiments, the negative electrode film layer further optionally includes a negative electrode conductive agent. The negative electrode conductive agent is not particularly limited in type in the embodiments of this application. In an example, the negative electrode conductive agent may include at least one of superconducting carbon, conductive graphite, acetylene black, carbon black, Ketjen black, carbon dots, carbon nanotubes, graphene, and carbon nanofibers. In some embodiments, a mass percentage of the negative electrode conductive agent in the negative electrode film layer is ≤5 wt %.

In some embodiments, the negative electrode film layer further optionally includes a negative electrode binder. The negative electrode binder is not limited to a particular type in the embodiments of this application. For example, the negative electrode binder may include at least one of styrene-butadiene rubber (SBR), water-soluble unsaturated resin SR-1B, waterborne acrylic resin (for example, polyacrylic acid PAA, polymethylacrylic acid PMAA, and polyacrylic acid sodium PAAS), polyacrylamide (PAM), polyvinyl alcohol (PVA), sodium alginate (SA), and carboxymethyl chitosan (CMCS). In some embodiments, a mass percentage of the negative electrode binder in the negative electrode film layer is ≤5%.

In some embodiments, the negative electrode film layer further optionally includes another adjuvant. In an example, the another adjuvant may include a thickener, for example, sodium carboxymethyl cellulose (CMC-Na) or PTC thermistor material. In some embodiments, a mass percentage of the another adjuvant in the negative electrode film layer is ≤2 wt %.

In some embodiments, the positive electrode current collector may be made of material aluminum, and the negative electrode current collector may be made of material copper.

In some embodiments, the separator includes a separation film. The separation film is not limited to any particular type in this application, and may be any well-known porous separation film with good chemical stability and mechanical stability.

The separation film is not particularly limited in type in the embodiments of this application, and may be any well-known porous separation film with good chemical stability and mechanical stability.

In some embodiments, the material of the separation film may include one or more of glass fiber, non-woven fabric, polyethylene, polypropylene, and polyvinylidene fluoride. The separation film may be a single-layer film or a multi-layer composite film, and is not particularly limited. When the separation film is a multi-layer composite film, all layers may be made of same or different materials, which is not particularly limited.

In some embodiments, the separation film may include a porous base film and a coating disposed on at least one side of the porous base film. The coating may include at least one of inorganic particles or organic particles.

The porous base film may include one or more of polyethylene and polypropylene.

Inorganic particles have good heat resistance and can improve the overall heat resistance of the separation film. In the operating voltage range of sodium-ion batteries, inorganic particles basically do not undergo oxidation and reduction reactions with metal dendrites. In other words, inorganic particles are configured not to undergo oxidation and reduction reactions with alkali metals and/or alkaline earth metals at the nominal voltage of a sodium-ion battery.

In some embodiments, the inorganic particles include one or more of boehmite γ-AlOOH, alumina $Al_2O_3$, aluminum hydroxide $Al(OH)_3$, barium sulfate $BaSO_4$, magnesium oxide MgO, magnesium hydroxide $Mg(OH)_2$, calcium oxide CaO, cerium oxide $CeO_2$, zirconium titanate $SrTiO_3$, barium titanate $BaTiO_3$, and magnesium fluoride $MgF_2$.

In some embodiments, the organic particles include at least one of polystyrene, polyethylene, polyimide, melamine resin, phenolic resin, polypropylene, polyester (such as polyethylene terephthalate, polyethylene naphthalate, polybutylene terephthalate), polyphenylene sulfide, polyamide, polyamide-imide, polyimide, copolymers of butyl acrylate and ethyl methacrylate, and mixtures thereof.

In some embodiments, the battery cell 7 also includes an electrolyte.

During the charge and discharge of the battery cell, active ions are intercalated and deintercalated back and forth between the positive electrode plate and the negative electrode plate. The electrolyte plays a role of conducting active ions between the positive electrode plate and the negative electrode plate. The electrolyte is not particularly limited in type in the embodiments of this application and may be selected according to actual needs.

The electrolyte includes an electrolytic salt and a solvent. The electrolytic salt and solvent are not specifically limited in type and may be selected according to actual needs.

The electrolyte includes an electrolytic salt and a solvent. The electrolytic salt and solvent are not specifically limited in type and may be selected according to actual needs.

When the battery cell 7 in the embodiments of this application is a lithium-ion battery, for example, the electrolytic salt may include but is not limited to at least one of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bis(trifluoromethanesulfonyl)imide (LiTFSI), lithium trifluoromethanesulfonate (LiTFS), lithium difluorooxalatoborate (LiDFOB), lithium dioxalatoborate (LiBOB), lithium difluorophosphate ($LiPO_2F_2$), lithium difluorobis(oxalatophosphate) (LiDFOP), and lithium tetrafluorooxalatophosphate (LiTFOP).

When the battery cell 7 in the embodiments of this application is a sodium-ion battery, for example, the electrolytic salt may include but is not limited to at least one of sodium hexafluorophosphate ($NaPF_6$), sodium tetrafluoroborate ($NaBF_4$), sodium perchlorate ($NaClO_4$), sodium hexafluoroarsenate ($NaAsF_6$), sodium bis(fluorosulfonyl) imide (NaFSI), sodium bis(trifluoromethanesulfonyl)imide (NaTFSI), sodium trifluoromethanesulfonate (NaTFS), sodium difluorooxalatoborate (NaDFOB), sodium dioxalatoborate (NaBOB), sodium difluorophosphate ($NaPO_2F_2$), sodium difluorobis(oxalatophosphate) (NaDFOP), and sodium tetrafluorooxalatophosphate (NaTFOP).

In an example, the solvent may include but is not limited to at least one of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methyl sulfone (EMS), and diethyl sulfone (ESE).

In some embodiments, the electrolyte further optionally includes an additive. For example, the additive may include a negative electrode film-forming additive, or may include a positive electrode film-forming additive, or may include an additive that can improve some performance of the battery, for example, an additive for improving over-charge performance of the battery, an additive for improving high-temperature performance of the battery, and an additive for improving low-temperature performance of the battery.

As shown in FIG. 4 and FIG. 5, in some embodiments, the electrode assembly 10 may be a wound structure or a stacked structure, and optionally, the electrode assembly 10 is a wound structure. The positive electrode plate and the negative electrode plate are wound into a wound structure.

In an example, multiple positive electrode plates and negative electrode plates can be provided respectively, and the multiple positive electrode plates and negative electrode plates are alternately stacked.

In some embodiments, the housing 20 includes a housing body 21 and an end cover 22, where the housing body 21 has an opening, and the end cover 22 is used to cover the opening.

The housing body 21 is a component configured to form an internal cavity of the battery cell 7 together with the end cover 22, where the formed internal cavity may be used to accommodate the electrode assembly 10, an electrolyte, and other components.

The housing body 21 and the end cover 22 may be independent components. For example, an opening may be provided on the housing body 21, and the end cover 22 covers the opening to form the internal cavity of the battery cell 7.

The end cover 22 is connected to the housing body 21 by welding, bonding, snapping, or other methods.

The housing body 21 may be provided with an opening at one end or two ends. In some examples, the housing body 21 may be a structure with an opening on one side, and one end cover 22 is provided to cover the housing body 21. In some other examples, the housing body 21 may alternatively be a structure with an opening on two sides, and two end covers 22 are provided to cover the two openings of the housing body 21 respectively.

In some embodiments, the housing body 21 includes a side wall 212 and an end wall 211 connected to the side wall 212. The end wall 211 and the end cover 22 are opposite to each other along the axial direction of the battery cell 7. The end cover 22 is sealingly connected to the side wall 212, and the side wall 212 surrounds the electrode assembly 10.

In some embodiments, the end wall 211 and the side wall 212 may have the same polarity.

In some embodiments, the end wall 211 and the side wall 212 are integrally formed, which means that the housing body 21 is an integrally formed member. Certainly, the end wall 211 and the side wall 212 may also be provided as two separate members and then connected together by welding, riveting, bonding, or other methods.

From the appearance of the electrode assembly 10, the electrode assembly 10 includes a main body 12, a first tab 111, and a second tab 112. The first tab 111 and the second tab 112 have opposite polarities. The first tab 111 and the second tab 112 both protrude from the main body 12. The first tab 111 is the part of the first electrode plate not coated with an active material layer, and the second tab 112 is the part of the second electrode plate not coated with an active material layer. The first tab 111 and the second tab 112 are configured to draw current out of the main body 12. The first electrode plate and the second electrode plate have opposite polarities. In other words, one of the first electrode plate and the second electrode plate is a positive electrode plate, and the other is a negative electrode plate.

Description is made in an example with the first tab 111 as a negative electrode tab and the second tab 112 as a positive electrode tab. In the negative electrode plate, the part of the negative electrode current collector not coated with an active material layer is the negative electrode tab, and the active material coated on the negative electrode current collector forms the negative electrode film layer. The negative electrode film layer and the part of the negative electrode current collector coated with active material form part of the main body 12. In the positive electrode plate, the part of the positive electrode current collector not coated with an active material layer is the positive electrode tab, and the active material coated on the positive electrode current collector forms the positive electrode film layer. The positive electrode film layer and the part of the positive electrode current collector coated with active material form part of the main body 12.

In some embodiments, the battery cell 7 includes a first electrode lead-out portion and a second electrode lead-out portion. The first electrode lead-out portion is electrically connected to the first tab 111, and the second electrode lead-out portion is electrically connected to the second tab 112.

In an axial direction of the main body 12, the first electrode lead-out portion and the second electrode lead-out portion may alternatively be located on two sides of the electrode assembly, or the first electrode lead-out portion and the second electrode lead-out portion may be located on a same side of the electrode assembly. For example, the second electrode lead-out portion includes an electrode terminal 30 provided on and insulated from the end wall 211, and the first electrode lead-out portion is the end wall 211.

The first tab 111 and the second tab 112 may protrude from a same side of the main body 12, or may protrude from two opposite sides respectively.

The first tab 111 and the second tab 112 may be disposed on two sides of the main body 12 along its axial direction. In other words, the first tab 111 and the second tab 112 are disposed at two ends of the electrode assembly 10 along its axial direction.

Optionally, the first tab 111 is wound around the central axis of the electrode assembly 10 for multiple turns, and the first tab 111 includes multiple tab layers. After the winding is completed, the first tab 111 is generally cylindrical, and there is a gap between two adjacent tab layers. In the embodiments of this application, the first tab 111 can be processed to reduce the gap between tab layers, facilitating the connection of the first tab 111 with other conductive structures. For example, in the embodiments of this application, the first tab 111 may be kneaded and flattened, so that end portions of the first tab 111 away from the main body 12 are gathered together. A dense end surface is formed at an end of the first tab 111 away from the main body 12 by the kneading and flattening process, which reduces the gap between tab layers and facilitates the connection between the first tab 111 and other conductive structures. Alternatively, in the embodiments of this application, a conductive material may alternatively be filled between two adjacent tab layers, so as to reduce the gap between the tab layers.

Optionally, the second tab 112 is wound around the central axis of the electrode assembly 10 for multiple turns, and the second tab 112 includes multiple tab layers. For example, the second tab 112 has also undergone the kneading and flattening process so as to reduce the gap between the tab layers of the second tab 112.

The first tab 111 is electrically connected to the end cover 22. The first tab 111 can be directly electrically connected to the end cover 22 or indirectly electrically connected to the end cover 22 through other conductive structures, and the end cover 22 is electrically connected to the end wall 211.

The second tab 112 is electrically connected to the electrode terminal 30 of the battery cell 7, and the electrode terminal 30 is provided on and insulated from the end wall 211. The second tab 112 can be directly electrically connected to the electrode terminal 30 or indirectly electrically connected to the electrode terminal 30 through other conductive structures.

In some embodiments, the second tab 112 can be directly connected to the electrode terminal 30, for example, by welding, abutting, or other methods. Alternatively, the second tab 112 can also be indirectly connected to the electrode terminal 30 through other conductive components (such as a current collecting member 40) to achieve electrical connection between the second tab 112 and the electrode terminal 30.

The electrode terminal 30 is provided on and insulated from the end wall 211, so the electrode terminal 30 and the end wall 211 can have different polarities, and the electrode terminal 30 and the end wall 211 can serve as different output poles.

The end wall 211 can be provided with an electrode lead-out hole, and the electrode terminal 30 is provided on and insulated from the end wall 211 and installed in the electrode lead-out hole. The electrode lead-out hole facilitates leading out electrical energy from the electrode assembly 10 to the outside of the housing body 21.

The central axis of the electrode assembly 10 is an imaginary line. The central axis of the electrode assembly 10 may pass through the electrode lead-out hole or be offset from the electrode lead-out hole, which is not limited in this application.

The electrode terminal 30 may be fixed on the end wall 211. The electrode terminal 30 may be integrally fixed on the outside of the end wall 211 or extend into the interior of the housing 20 through the electrode lead-out hole.

When the first tab 111 is a negative electrode tab and the second tab 112 is a positive electrode tab, the end wall 211 is a negative output pole of the battery cell 7, and the electrode terminal 30 is a positive output pole of the battery cell 7. When the first tab 111 is a positive electrode tab and the second tab 112 is a negative electrode tab, the end wall 211 is a positive output pole of the battery cell 7, and the electrode terminal 30 is a negative output pole of the battery cell 7.

In some embodiments, the battery cell 7 includes an electrode assembly 10 and a housing 20. The electrode assembly 10 includes a negative electrode plate, where the negative electrode plate includes a negative electrode current collector and a negative electrode film layer disposed on at least one side of the negative electrode current collector and containing a negative electrode active material. The housing 20 accommodates the electrode assembly 10, and the housing 20 includes a side wall 212, where the side wall 212 surrounds the electrode assembly 10. The negative electrode active material includes element silicon, and the housing 20 is a cylindrical structure.

The battery cell 7 uses the negative electrode active material containing element silicon and the housing 20 of the cylindrical structure. Corresponding to the housing 20 of the cylindrical structure, the electrode assembly 10 is of the cylindrical structure. In a charging process of the battery cell 7, radial swelling forces of the electrode assembly 10 are the same in all directions, so that the swelling forces of the electrode assembly 10 are evenly distributed, thereby reducing compressive effect on the housing 20 and enhancing the structural stability of the housing 20. Therefore, this can allow the battery cell 7 to have excellent use reliability while improving energy density of the battery cell 7.

In some embodiments, a mass percentage of element silicon in the negative electrode film layer is 1% to 32%, optionally 2% to 19%, and further optionally 6% to 13%. The mass percentage of the element silicon being within the above range helps to enhance the energy density of the battery cell 7. With cooperation of the cylindrical housing 20, this helps the battery cell 7 to have relatively small volume swelling, thereby allowing the battery cell 7 to have excellent use reliability.

For example, the mass percentage of the element silicon in the negative electrode film layer may be 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, or 32%, or a range defined by any two of the foregoing values.

In some embodiments, the negative electrode active material includes element silicon. Element silicon may be present in the form of a silicon-based material. For example, the silicon-based material may include at least one of elemental silicon, a silicon-oxygen compound, a silicon-carbon composite, a silicon-nitrogen composite, and a silicon alloy. The introduction of element silicon can increase the energy density of the battery cell 7.

In the embodiments of this application, the mass percentage of element silicon in the negative electrode film layer has a meaning well known in the art, and can be measured using a device and method well known in the art. For example, the negative electrode plate is placed in a solvent such as water to soak, to separate the negative electrode active material from the negative electrode current collector, and substances in the negative electrode film layer are obtained by filtration and used as test samples. The percentage of element silicon can be obtained by analyzing the test samples using the ICAP7400 inductively coupled plasma emission spectrometer from Thermo Fisher Scientific, USA, with reference to the standard GB/T30902-2014.

In some embodiments, a capacity surface density of the negative electrode plate is greater than or equal to 3.2 mAh/cm$^2$, optionally 3.3 mAh/cm$^2$ to 11.5 mAh/cm$^2$, and further optionally 3.96 mAh/cm$^2$ to 7.56 mAh/cm$^2$. When the capacity surface density of the negative electrode plate is within the above range, it is conducive to enhancing the energy density of the battery cell 7.

For example, the capacity surface density of the negative electrode plate may be 3.2 mAh/cm$^2$, 3.3 mAh/cm$^2$, 3.33 mAh/cm$^2$, 3.5 mAh/cm$^2$, 3.8 mAh/cm$^2$, 3.9 mAh/cm$^2$, 4 mAh/cm$^2$, 4.2 mAh/cm$^2$, 4.5 mAh/cm$^2$, 4.8 mAh/cm$^2$, 4.9 mAh/cm$^2$, 5 mAh/cm$^2$, 5.2 mAh/cm$^2$, 5.5 mAh/cm$^2$ 5.8 mAh/cm$^2$, 6 mAh/cm$^2$, 6.2 mAh/cm$^2$, 6.5 mAh/cm$^2$, 6.8 mAh/cm$^2$, 7 mAh/cm$^2$, 7.5 mAh/cm$^2$, 8 mAh/cm$^2$, 8.5 mAh/cm$^2$, 9 mAh/cm$^2$, 9.5 mAh/cm$^2$, 10 mAh/cm$^2$, 10.5 mAh/cm$^2$, 11 mAh/cm$^2$, or 11.5 mAh/cm$^2$, or a range defined by any two of the foregoing values.

In addition, the housing 20 may be made of various materials. For example, the matrix material of the housing 20 includes but is not limited to copper, iron, aluminum, steel, and aluminum alloy. Optionally, the matrix material of the housing 20 includes steel, such as stainless steel. For example, the matrix material of the housing body includes steel, such as stainless steel. The housing body includes a side wall 212 and an end wall 211. In the embodiments of this application, the matrix material of the housing 20 refers to a material that accounts for the largest proportion in the housing 20.

The side wall 212 may be made of various materials, for example, the matrix material of the side wall 212 includes metal. For example, the metal includes but is not limited to copper, iron, aluminum, steel, aluminum alloy, and the like. Optionally, the matrix material of the side wall 212 includes steel, such as stainless steel. Side walls 212 made of the above metal materials have excellent mechanical strength, are not easily deformed, and can enhance the structural stability of the side walls 212, thereby improving the use reliability of the battery cell 7. In the embodiments of this application, the matrix material of the side wall 212 refers to a material that accounts for the largest proportion in the side wall 212.

In some embodiments, the matrix material of the side wall 212 includes steel, and a thickness of the side wall 212 is 0.3 mm to 0.9 mm, optionally 0.3 mm to 0.55 mm. When the thickness of the side wall 212 is within the above range, the mechanical strength of the side wall 212 is relatively high and will not be easily deformed. Using the side wall with the silicon-containing negative electrode is more conducive to improving the energy density of the battery cell 7 while providing excellent use reliability for the battery cell 7.

For example, the thickness of the side wall 212 may be 0.3 mm, 0.4 mm, 0.5 mm, 0.55 mm, 0.6 mm, 0.7 mm, 0.8 mm, or 0.9 mm, or a range defined by any two of the foregoing values.

In some embodiments, the side wall 212 and the end wall 211 are integrally formed, which is conducive to simplifying the preparation process. The matrix material of the end wall 211 includes metal. For example, the metal includes but is not limited to copper, iron, aluminum, steel, aluminum alloy, and the like. Optionally, the matrix material of the end wall 211 includes steel, such as stainless steel. End walls 211 made of the above metal materials have excellent mechanical strength, are not easily deformed, and can enhance the structural stability of the end walls 211, thereby improving the use reliability of the battery cell 7.

In some embodiments, the matrix material of the end wall 211 includes metal, and a thickness of the end wall 211 is 0.3 mm to 0.9 mm. For example, the matrix material of the end wall 211 includes steel, and the thickness of the end wall 211 is 0.3 mm to 0.9 mm.

In some embodiments, the capacity surface density of the negative electrode plate is greater than or equal to 3.2 mAh/cm$^2$, the matrix material of the side wall 212 includes steel, and the thickness of the side wall 212 is 0.3 mm to 0.9 mm. Using the negative electrode plate of the above capacity surface density with the side wall 212 of the above thickness is more conducive to improving the energy density of the battery cell 7 while providing excellent use reliability for the battery cell 7, and is beneficial to the improvement of cycling performance.

In some embodiments, the capacity surface density of the negative electrode plate is 3.3 mAh/cm$^2$ to 11.5 mAh/cm$^2$, the matrix material of the side wall 212 includes steel, and the thickness of the side wall 212 is 0.3 mm to 0.80 mm. Using the negative electrode plate of the above capacity surface density with the side wall 212 of the above thickness is more conducive to improving the energy density of the battery cell 7 while providing excellent use reliability for the battery cell 7, and is beneficial to the improvement of cycling performance.

In some embodiments, the capacity surface density of the negative electrode plate is 3.96 $mAh/cm^2$ to 11.5 $mAh/cm^2$, the matrix material of the side wall 212 includes steel, and the thickness of the side wall 212 is 0.3 mm to 0.50 mm. Using the negative electrode plate of the above capacity surface density with the side wall 212 of the above thickness is more conducive to improving the energy density of the battery cell 7 while providing excellent use reliability for the battery cell 7, and is beneficial to the improvement of cycling performance.

In the embodiments of this application, the capacity surface density of the negative electrode plate is of a meaning well known in the art, and it can be measured using a device and method well known in the art. For example: The foregoing negative electrode plate and a lithium metal sheet are used to form a pair of electrodes, which are then, by using the electrolyte and separation film from Example 1, assembled as a CR2430 button cell in an argon-protected glove box. After the assembled button cell is left standing for 12 hours at 25° C., it is discharged at 0.05C constant current to 0.005V. Then, it is left standing for 10 minutes, discharged again at 50 μA constant current to 0.005V, left standing for 10 minutes, and discharged again at 10 μA constant current to 0.005V. Finally, it is charged at 0.1C constant current to 2V. The charging capacity is recorded. The charging capacity to the area of the negative electrode plate is the capacity surface density.

In the embodiments of this application, the thickness of the side wall 212 is of a meaning well known in the art, and it can be measured using a device and method well known in the art. For example, a micrometer or a vernier caliper can be used for measurement.

In the embodiments of this application, through the regulation of at least one of the following conditions of the negative electrode film layer, the energy density and use reliability of the battery cell 7 can be further improved, and it is conducive to improving the cycling performance.

In some embodiments, a surface density of the negative electrode film layer is less than or equal to 10.5 $mg/cm^2$; optionally 6 $mg/cm^2$ to 10 $mg/cm^2$.

In some embodiments, a porosity of the negative electrode film layer is greater than or equal to 10%, and less than 100%; optionally 20% to 40%.

In some embodiments, a compacted density of the negative electrode film layer is less than or equal to 1.75 $g/cm^3$; optionally 1.4 $g/cm^3$ to 1.7 $g/cm^3$.

In the embodiments of this application, the surface density of the negative electrode film layer is of a meaning well known in the art, and it can be tested using a method and device well known in the art. For example, a single-side-coated and cold-pressed negative electrode plate may be taken (if it is a double-side-coated negative electrode plate, one side of the negative electrode film layer may be wiped off first), and punched into a small wafer with an area of $S_1$. The wafer is weighed and the weight is recorded as $M_1$. Then, the negative electrode film layer of the weighed negative electrode plate is wiped off, the negative electrode current collector is weighed, and the weight is recorded as $M_0$. The surface density of the negative electrode plate=$(M_1-M_0)/S_1$.

In the embodiments of this application, the compacted density of the negative electrode film layer is of a meaning well known in the art, and it can be tested using a method and device well known in the art. For example: the compacted density of the negative electrode film layer=surface density of the negative electrode film layer/thickness of the negative electrode film layer. The thickness of the negative electrode film layer is of a meaning well known in the art, and it can be tested using a method well known in the art. For example, a micrometer (such as the Mitutoyo 293-100 model, with an accuracy of 0.1 μm) can be used for measurement.

In the embodiments of this application, the porosity of the negative electrode film layer is of a meaning well known in the art, and it can be tested using a method and device well known in the art. For example, a single-side-coated and cold-pressed negative electrode plate may be taken (if it is a double-side-coated negative electrode plate, one side of the negative electrode film layer may be wiped off first), and punched into a small wafer with a certain area. The apparent volume $V_1$ of the negative electrode plate is calculated. Referring to GB/T24586-2009, using an inert gas (such as helium or nitrogen) as the medium, and using the gas displacement method, the true volume $V_2$ of the negative electrode plate is measured by using a true density meter. The porosity of the negative electrode film layer=$(V_1-V_2)/V_1\times100\%$. Multiple (for example 30) samples of negative electrode plates with good appearance and no powder shedding from edges can be tested, and the results are averaged, thereby improving the accuracy of the test results. For the test instrument, the Micromeritics AccuPyc II 1340 true density tester can be used.

Figure 6:
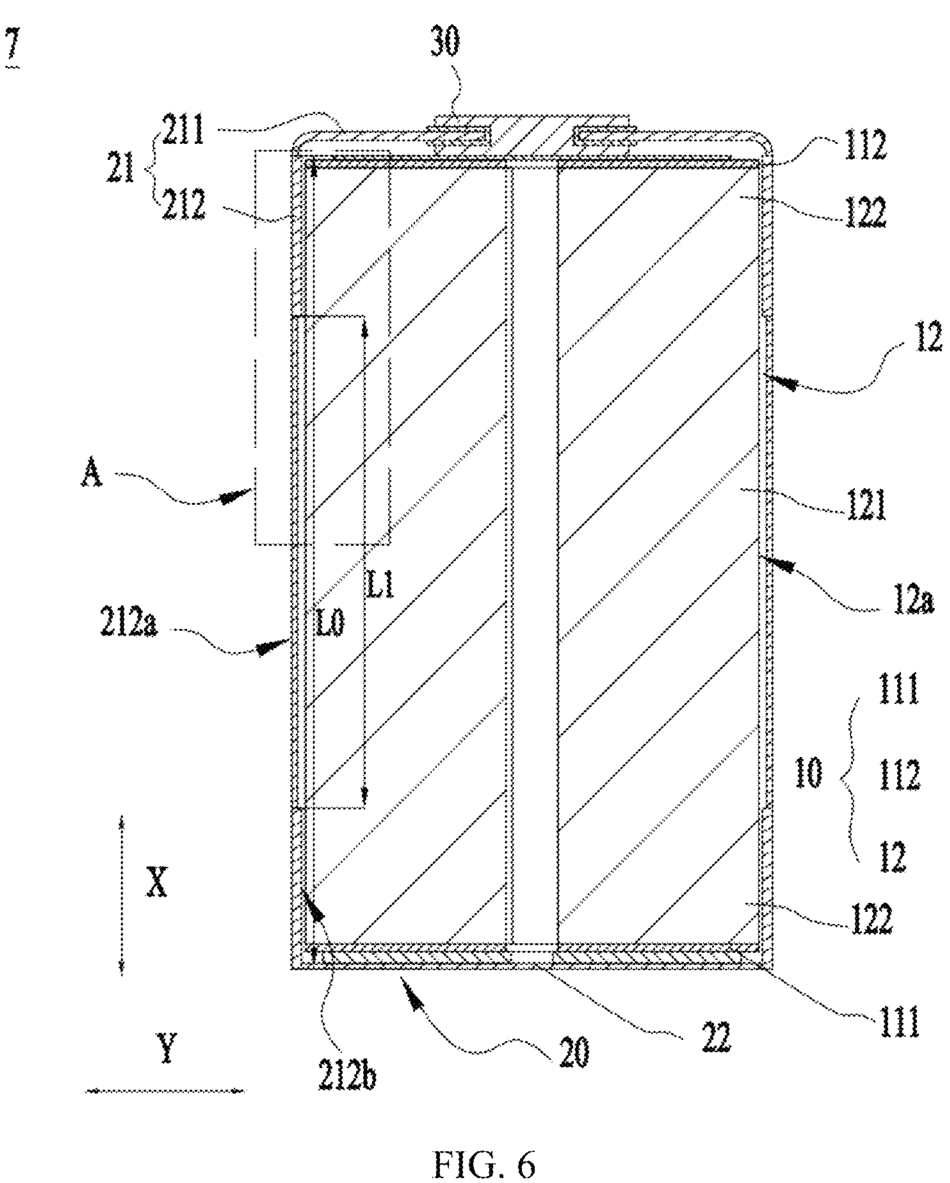
FIG. 6 is a schematic cross-sectional diagram of a battery cell according to some embodiments of this application.
Figure 7:
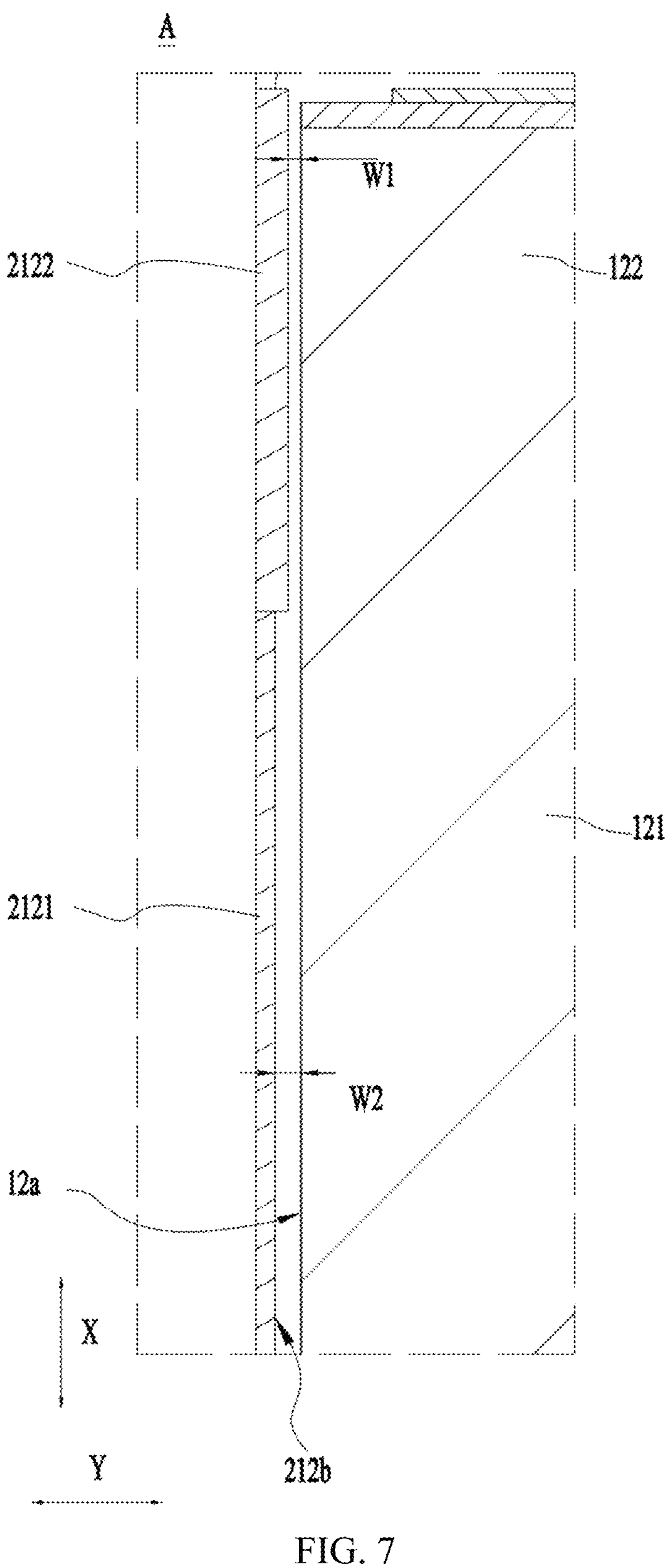
FIG. 7 is an enlarged schematic diagram of the cylindrical battery cell at position A shown in FIG. 6.
Figure 8:
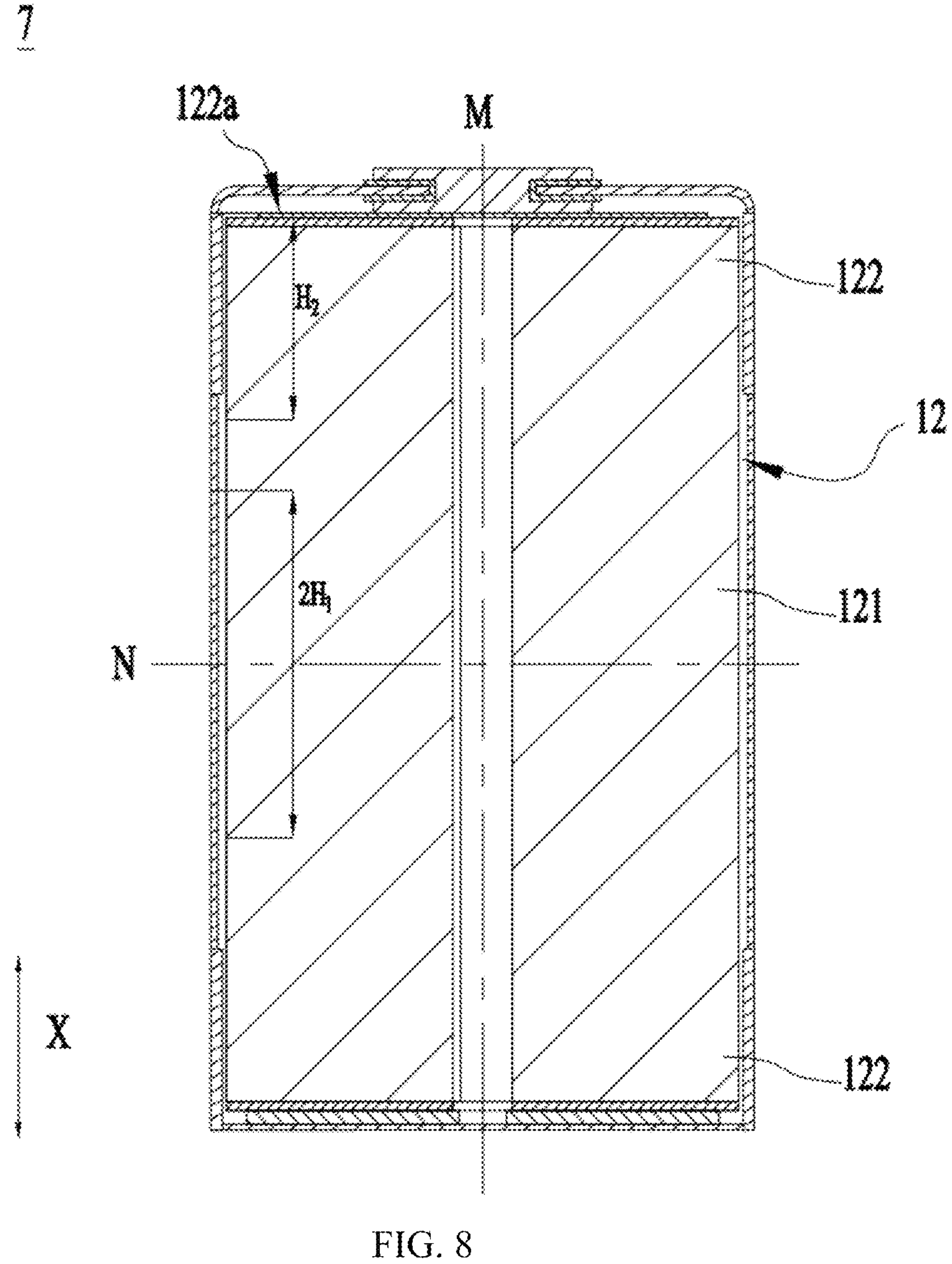
FIG. 8 is a schematic cross-sectional diagram of a battery cell according to some embodiments of this application.

FIG. 6 is a schematic cross-sectional diagram of a cylindrical battery cell according to some embodiments of this application. FIG. 7 is an enlarged schematic diagram of the cylindrical battery cell at position A shown in FIG. 6. FIG. 8 is a schematic cross-sectional diagram of a battery cell according to some embodiments of this application.

As shown in FIGS. 6 to 8, in some embodiments, the battery cell 7 includes a housing 20 and an electrode assembly 10 accommodated in the housing 20, where the housing 20 includes a side wall 212, and the side wall 212 surrounds the electrode assembly 10. The electrode assembly 10 includes a main body 12, the main body 12 includes a middle region 121 and two end regions 122 arranged along its axial direction, and the middle region 121 is located between the two end regions 122; where in a radial direction of the main body 12, a distance between an outer surface of the middle region 121 and an inner surface 212*b* of the side wall 212 is greater than a distance between an outer surface of the end region 122 and the inner surface 212*b* of the side wall 212.

The X direction shown in FIGS. 6 and 7 represents the axial direction of the main body 12, and the axial direction of the main body 12 is the axial direction of the electrode assembly 10 and is parallel to the axial direction of the housing 20. The Y direction represents the radial direction of the main body 12, and the radial direction of the main body 12 is the radial direction of the electrode assembly 10 and is parallel to the radial direction of the housing 20. The X direction is perpendicular to the Y direction.

During the charging process of the battery cell 7, the main body 12 may undergo volume swelling, creating a risk of compression of the side wall 212 by the main body 12. The internal stress of the main body 12 is basically uniform in the radial direction Y Due to the higher degree of swelling freedom of the end region 122, in the axial direction X, the end region 122 of the main body 12 may further compress the middle region 121, increasing the internal stress of the middle region 121, leading to a greater degree of swelling in the radial direction Y, which in turn heightens the risk of the middle region 121 pressing against and damaging the side wall 212. In the embodiments of this application, a gap is provided between the main body 12 and the side wall 212, and the presence of this gap reserves swelling space for the main body 12, reducing the risk of compression of the side wall 212 by the main body 12. Additionally, this enables the distance between the outer surface of the end region 122 and the inner surface 212*b* of the side wall 212 to be relatively smaller, and the distance between the outer surface of the middle region 121 and the inner surface 212*b* of the side wall 212 to be relatively larger, reserving more adequate swelling space for the middle region 121. This effectively reduces the compressive force of the main body 12 on the side wall 212, thereby enhancing the use reliability of the battery cell 7.

In the embodiments of this application, the distance between the outer surface of the middle region 121 and the inner surface 212*b* of the side wall 212 is greater than the distance between the outer surface of the end region 122 and the inner surface 212*b* of the side wall 212. This can be understood as a minimum distance between the outer surface of the middle region 121 and the inner surface 212*b* of the side wall 212 being greater than a maximum distance between the outer surface of the end region 122 and the inner surface 212*b* of the side wall 212.

The inner surface 212*b* of the side wall 212 is the surface of the side wall 212 facing the main body 12, and the outer surface 12*a* of the main body 12 can also be understood as the surface of the main body 12 facing the side wall 212. Specifically, for example, the end region 122 includes an end surface 122*a* facing away from the middle region 121. The size of the main body 12 in the axial direction X is defined as L. The position of the end face 122*a* of one of the end regions 122 in the two end regions 122 is defined as the origin. The position of the end face 122*a* of another end region 122 is L. The distance between the main body 12 at L/3 and the side wall 212 is measured. This can involve measuring the corresponding distances between multiple positions on the outer surface 12*a* of the main body 12 at L/3 and the side wall 212, using the average value as the distance at that location.

In FIG. 7, W1 represents the distance between the outer surface at one position in the end region 122 and the inner surface 212*b* of the side wall 212; and W2 represents the distance between the outer surface at one position in the middle region 121 and the inner surface 212*b* of the side wall 212, where W2 is greater than W1.

The end region 122 is a structure with a certain size in the axial direction X. The two end faces 122*a* of the main body 12, which are opposite to each other in the axial direction X, are the respective end faces 122*a* of the two end regions 122. The end region 122 is the region from the end face 122*a* to a distance $H_2$ from the end face. For example, $H_2$ may be 20 mm, which means the size of the end region 122 in the axial direction X is 20 mm. $H_2$ shown in FIG. 8 represents the size of the end region 122 in the axial direction X.

The middle region 121 is a structure with a certain size in the axial direction X. The middle region 121 is the region from the mid-section to a distance $H_1$ from the mid-section. The mid-section is a section that includes the center point of the main body 12 on its own axis, and this mid-section is perpendicular to the axis of the main body 12. For example, $H_1$ may be 5 mm, and $2H_1$ is 10 mm, which means the size of the middle region 121 in the axial direction X is 10 mm. $2H_1$ shown in FIG. 8 represents the size of the middle region 121 in the axial direction X, M represents the axis of the main body 12, and N represents a line located in the mid-section of the main body 12.

The main body 12 of the electrode assembly 10 includes end regions 122 and a middle region 121. To be specific, the main body 12 includes an end region 122, a middle region 121, and an end region 122 arranged along the axial direction X. The end region 122 may be directly connected to the middle region 121. In other words, the main body 12 includes an end region 122, a middle region 121, and an end region 122 arranged in sequence along the axial direction X. Of course, a connecting region may also be included between the end region 122 and the middle region 121. For example, the main body 12 includes an end region 122, a connecting region, a middle region 121, a connecting region, and an end region 122 arranged along the axial direction X.

In some embodiments, a mass percentage of element silicon in the negative electrode film layer is 1% to 32%, optionally 2% to 19%, and further optionally 6% to 13%. In the battery cell 7 system, with the mass percentage of element silicon falling within the above range, the energy density of the battery cell 7 can be increased. Moreover, the above negative electrode film layer will undergo volume swelling during charging, which further cooperates with the structural features of the battery cell 7 (such as the distance between the outer surface of the middle region 121 and the inner surface 212*b* of the side wall 212 being greater than the distance between the outer surface of the end region 122 and the inner surface 212*b* of the side wall 212), making the gap between the housing 20 and the middle region 121 of the electrode assembly 10 is relatively large, which can reserve more adequate swelling space, reduce the compressive effect on the housing 20, and enhance the structural stability of the housing 20, further improving the use reliability of the battery cell 7.

In some embodiments, in a direction from the end region 122 to the middle region 121, the distance between the outer surface of the middle region 121 and the inner surface 212*b* of the side wall 212 first decreases and then increases. The direction from the end region 122 to the middle region 121 is parallel to the axial direction X of the main body 12, but the direction from the end region 122 to the middle region 121 is unidirectional.

The distance between the outer surface of the middle region 121 and the inner surface 212*b* of the side wall 212 first decreases and then increases, making the gap increase when it gets closer to the center of the middle region 121 in axial direction X. This provides more reserved swelling space, further reducing the risk of the middle region 121 compressing the housing 20 and enhancing the use reliability of the battery cell 7.

In the embodiments of this application, the housing 20 may be provided in various structural forms to increase the swelling space of the middle region 121. The following will describe the structural form of the housing 20.

As shown in FIGS. 6 to 8, in some embodiments, the side wall 212 includes a first part 2121 and a second part 2122 arranged along the axial direction X, the first part 2121 is opposite to the middle region 121 in the radial direction Y, the second part 2122 protrudes in the radial direction Y from a surface of the first part 2121 facing the main body 12, and the second part 2122 is opposite to the end region 122 in the radial direction Y.

During the charging process of the battery cell 7, the end region 122 swells in the radial direction Y toward the second part 2122, the middle region 121 swells in the radial direction Y toward the first part 2121, and the swelling degree of the middle region 121 is greater; the second part 2122 protrudes in the radial direction Y from the first part 2121, the distance between the inner surface 212*b* of the second part 2122 and the outer surface of the end region 122 is relatively smaller, and the distance between the inner surface 212*b* of the first part 2121 and the outer surface of the middle region 121 is larger, reserving more swelling space for the middle region 121, which is beneficial to reducing the risk of the middle region 121 compressing the housing 20 and enhancing the use reliability of the battery cell 7.

Optionally, the first part 2121 may further be opposite to a part of the end region 122 in the radial direction Y, and the second part 2122 may be opposite to another part of the end region 122 in the radial direction Y.

Optionally, in a direction from the middle region 121 to the end region 122, the distance between the outer surface of the end region 122 and the inner surface 212*b* of the side wall 212 increases. The direction from the middle region 121 to the end region 122 is parallel to the axial direction X of the main body 12, but the direction from the middle region 121 to the end region 122 is unidirectional, where the direction is parallel to the direction from the end region 122 to the middle region 121, but opposite in direction.

The end region 122 is a structure with a certain size in the axial direction X. As the position gets closer to the end face 122*a* of the end region 122, the degree of freedom for swelling increases and the internal stress decreases. Conversely, along the axial direction X, as the distance from the end face 122*a* increases, the internal stress increases, and the degree of swelling in the radial direction Y increases. In the embodiments of this application, the distance between the outer surface of the end region 122 and the inner surface 212*b* of the side wall 212 increases, which allows the reserved swelling space to increase. This is conducive to reducing the risk of the end region 122 compressing the housing 20, thus improving the use reliability of the battery cell 7.

In some embodiments, the second part 2122 may be configured as at least one, for example, one or two.

For example, when the second part 2122 is configured as one, the second part 2122 may be located at either end of the main body 12 along the axial direction X.

Alternatively, for example, the second part 2122 is configured as two, and the two second parts 2122 are respectively located on two sides of the first part 2121 along the axial direction X. When the second part 2122 is configured as two, the two end regions 122 of the main body 12 each are provided with a second part 2122. The cooperation of the end region 122 and the second part 2122 helps to reduce the risk of the end region 122 compressing the housing 20, while the second part 2122 also enhances the mechanical strength of the housing 20 and its resistance to deformation, further improving the use reliability of the battery cell 7.

In some embodiments, a size of the first part 2121 along the axial direction X is 0.4 to 0.98 times a size of the side wall 212 along the axial direction X, for example, 0.4 times, 0.45 times, 0.5 times, 0.55 times, 0.6 times, 0.65 times, 0.7 times, 0.75 times, 0.8 times, 0.85 times, 0.9 times, 0.95 times, or 0.98 times, or a range defined by any two of the foregoing values. L1 shown in FIG. 6 is the size of the first part 2121 along the axial direction X, and L0 is the size of the side wall 212 along the axial direction X.

The size of the first part 2121 along the axial direction X being within the above range can provide more swelling space for the middle region 121. This helps further reduce the risk of the middle region 121 compressing the housing 20 and enhances the use reliability of the battery cell 7.

In some embodiments, an outer peripheral surface 212*a* of the side wall 212 is a cylindrical surface, making the battery cell 7 a standard cylindrical structure, which means that during the charging process of the battery cell 7, the side wall 212 basically does not deform, or the swelling deformation degree of the first part 2121 and the second part 2122 is small, and the deformation difference is small. In other words, the swelling of the electrode assembly 10 has little or no effect on the side wall 212, thereby enhancing the structural stability of the battery cell 7. In this structural form, the side wall 212 is of non-uniform thickness, and through the non-aligned configuration of the inner surface 212*b* of the side wall 212, more adequate swelling space is reserved for the middle region 121. Of course, in some other embodiments, the outer peripheral surface 212*a* of the side wall 212 may also present as an arched surface protruding in the direction leaving the electrode assembly 10. In the above embodiments of this application, the outer peripheral surface 212*a* of the side wall 212 is opposite to the inner surface 212*b* of the side wall 212 in the radial direction Y.

Figure 9:
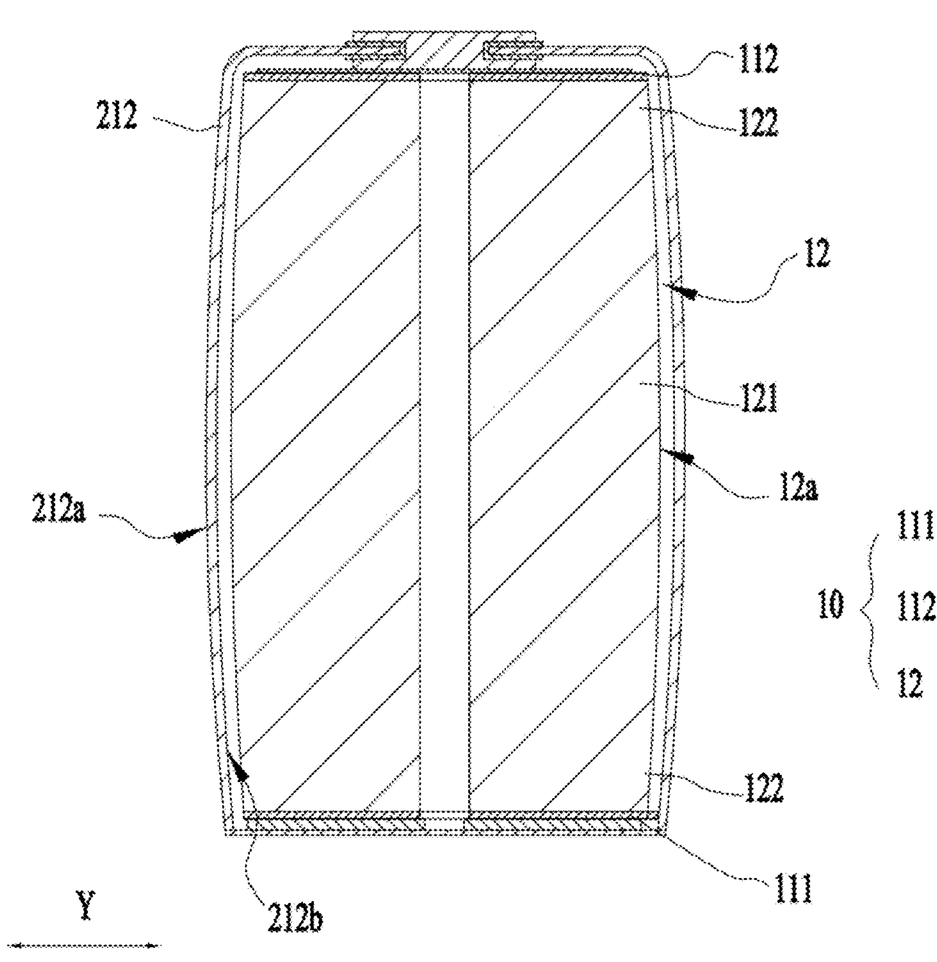
FIG. 9 is a schematic cross-sectional diagram of a battery cell according to some other embodiments of this application.

FIG. 9 is a schematic cross-sectional diagram of a cylindrical battery cell according to some other embodiments of this application.

As shown in FIG. 9, in other embodiments, the inner surface 212*b* of the side wall 212 is an arched surface, that is, the surface of the side wall 212 facing the electrode assembly 10 is an arched surface, and concaves toward a direction leaving the electrode assembly 10. Through the arched surface configuration of the side wall 212, more adequate swelling space is reserved for the middle region 121; specifically, a side wall 212 portion opposite to the middle region 121 may be configured to be relatively deeper in its concavity, and a side wall 212 portion opposite to the end region 122 may be configured to be relatively shallower in its concavity.

For example, the side wall 212 may have a uniform thickness or may have a non-uniform thickness.

When the side wall 212 has a uniform thickness, the forming process of the side wall 212 is simpler and when the electrode assembly 10 exerts pressure on the side wall 212, the deformation of the side wall 212 is more moderate, reducing the likelihood of stress concentration problems, thus enhancing the use reliability of the side wall 212. Optionally, in the radial direction Y, the side wall 212 protrudes in the direction leaving the electrode assembly 10, and the side wall 212 as a whole presents a slightly convex structural form. Specifically, the outer peripheral surface 212*a* of the side wall 212 may be an arched surface, and this arched surface protrudes in the direction leaving the electrode assembly 10. FIG. 8 shows the structural form of the side wall 212 having a uniform thickness.

Figure 10:
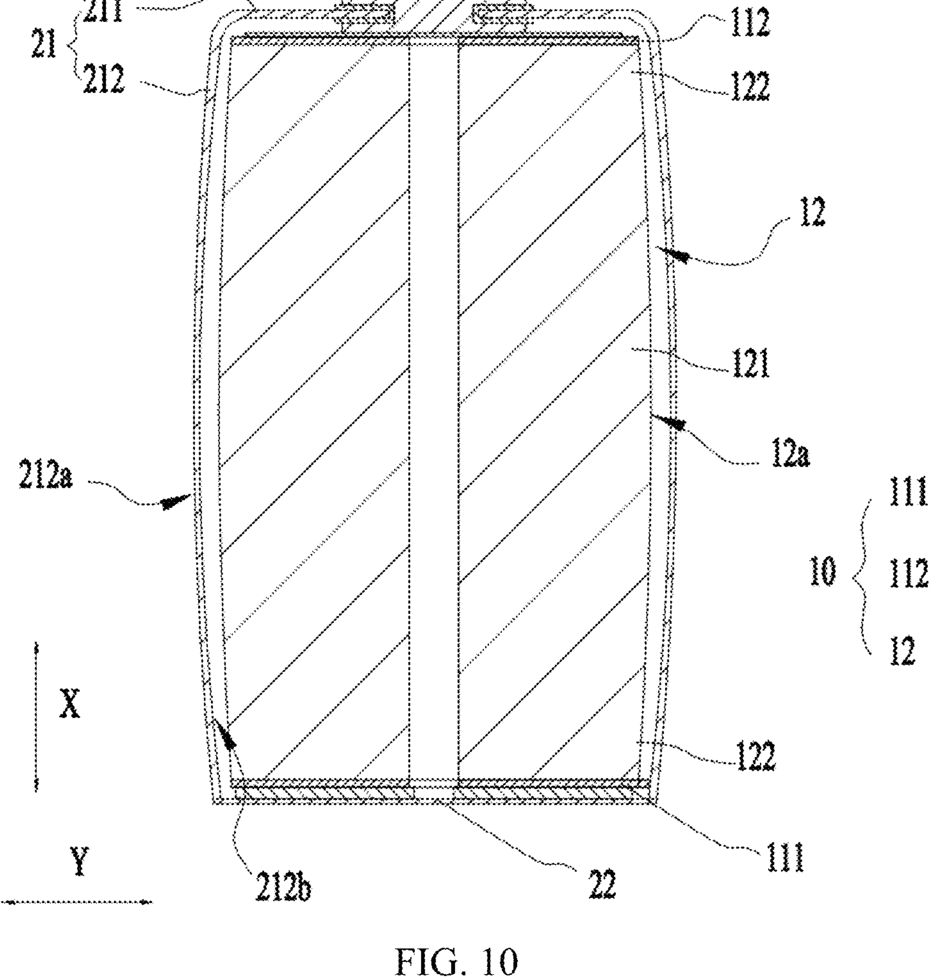
FIG. 10 is a schematic cross-sectional diagram of a battery cell according to still some other embodiments of this application.

FIG. 10 is a schematic cross-sectional diagram of a cylindrical battery cell according to still some other embodiments of this application.

As shown in FIG. 10, when the side wall 212 has non-uniform thickness, in a direction from one of the two end regions 122 to the other end region 122, the thickness of the side wall 212 first decreases and then increases. This trend of the side wall 212 thickness first decreasing and then increasing reserves more swelling space for the middle region 121. Specifically, at the position of the middle region 121, a larger gap can be correspondingly provided to reserve more adequate swelling space.

Optionally, in the radial direction Y, the side wall 212 protrudes in the direction leaving the electrode assembly 10, and the side wall 212 as a whole presents a slightly convex structural form. This design easily allows for greater swelling space to be reserved for the middle region 121. Specifically, the outer peripheral surface 212*a* of the side wall 212 may be an arched surface, and this arched surface protrudes in the direction leaving the electrode assembly 10. Of course, when the side wall 212 has a non-uniform thickness, the outer peripheral surface of the side wall 212 may also be a cylindrical surface.

In the embodiments of this application, the distance test is conducted when the cylindrical battery cell 7 is in a 0% state of charge SOC, and it can be tested using a device and method well known in the art. Specifically, at 25° C., the above cylindrical battery cell 7 is discharged at 0.33C to 2.5V and then discharged at 0.1C to 2.5V. At this time, the cylindrical battery cell 7 is in a 0% state of charge. The cylindrical battery cell 7 in a 0% state of charge is placed in an X-ray computed tomography scanner (brand: GE; model: Phoenix Nanotom M) for testing according to the ISO 15708:2002 standard to obtain a computed tomography image of the cylindrical battery cell 7 in the axial direction X and radial direction Y Based on the image, the distances between various points on the side wall 212 and the main body 12 are measured, thus the distance between the middle region 121 and the side wall 212, as well as the distance between the end region 122 and the side wall 212 are measured.

Principle of the X-ray computed tomography scanner: When an X-ray beam of certain energy and intensity passes through the battery cell 7, based on the different attenuation and distribution of the X-ray beam in the object being examined, a tomographic image is obtained through image reconstruction algorithms. Finally, computer information processing and image reconstruction technology are used to obtain a three-dimensional image of the sample.

In some embodiments, when a state of charge of the battery cell 7 is 100%, a distance between the outer surface of the middle region 121 and the inner surface 212*b* of the side wall 212 in the radial direction Y is a first middle distance; and when the state of charge of the battery cell 7 is 0%, the distance between the outer surface of the middle region 121 and the inner surface 212*b* of the side wall 212 in the radial direction Y is a second middle distance; where the first middle distance is less than the second middle distance, and a difference between the first middle distance and the second middle distance is less than or equal to 0.05 mm.

In the battery cell 7, the negative electrode active material may experience volume swelling during charging. When the battery cell 7 is at 100% SOC, the volume swelling of the negative electrode active material is relatively large. In this case, the distance between the outer surface of the middle region 121 and the inner surface 212*b* of the side wall 212 in the radial direction Y is the first middle distance. Correspondingly, when the battery cell 7 is at 0% SOC, the battery cell 7 is in a fully discharged state, and the volume swelling of the negative electrode active material is relatively small. In this case, the distance between the outer surface of the middle region 121 and the inner surface 212*b* of the side wall 212 in the radial direction Y is the second middle distance. When the difference between the first middle distance and the second middle distance is within the above range, the battery cell 7 has a small degree of volume swelling in a charging process. This helps enhance the structural stability and improve the use reliability of the battery cell 7.

For example, the difference between the first middle distance and the second middle distance is less than or equal to 0.05 mm, for example, 0.05 mm, 0.045 mm, 0.04 mm, 0.035 mm, 0.03 mm, 0.025 mm, 0.02 mm, 0.015 mm, 0.01 mm, 0.005 mm, or 0, or a range defined by any two of the foregoing values.

The difference between the first middle distance and the second middle distance can be calculated by measuring the distances between a same position in the middle region 121 and the side wall 212 at different states of charge. Furthermore, multiple distances between multiple positions in the middle region 121 and the side wall 212 at different states of charge can be measured, and the average value of the differences in the multiple distances can be taken as the difference between the first middle distance and the second middle distance. For example, the difference in the distances between the first position in the middle region 121 and the side wall 212 at different states of charge is measured as the first distance, the difference in the distances between the second position in the middle region 121 and the side wall 212 at different states of charge is measured as the second distance, and the average value of the first distance and the second distance is the difference between the first middle distance and the second middle distance.

In the embodiments of this application, the distance test of the cylindrical battery cell 7 at 100% state of charge SOC can be performed by using a device and method well known in the art. Specifically, at 25° C., the prepared cylindrical battery cell 7 is charged at 0.33C to 4.25V and then further charged at 0.1C to 4.25V. At this time, the cylindrical battery cell 7 is in a 100% state of charge. The cylindrical battery cell 7 in a 100% state of charge is placed in an X-ray computed tomography scanner (brand: GE; model: Phoenix Nanotom M) for testing according to the ISO 15708:2002 standard to obtain a computed tomography image of the cylindrical battery cell 7 in the axial direction X and radial direction Y Based on the image, the distances between various points on the side wall 212 and the main body 12 are measured, thus the distance between the outer surface of the middle region 121 and the inner surface 212*b* of the side wall 212, as well as the distance between the outer surface of the end region 122 and the inner surface 212*b* of the side wall 212 are measured.

In some embodiments, when the state of charge of the battery cell 7 is 100%, a distance between the end region 122 and the inner surface 212*b* of the side wall 212 in the radial direction Y is a first end distance; and when the state of charge of the battery cell 7 is 0%, the distance between the end region 122 and the inner surface 212*b* of the side wall 212 in the radial direction Y is a second end distance; where the first end distance is less than the second end distance, and a difference between the first end distance and the second end distance is less than or equal to 0.05 mm.

When the battery cell 7 is at 100% SOC, the volume swelling of the negative electrode active material is relatively large. In this case, the distance between the outer surface of the end region 122 and the inner surface 212*b* of the side wall 212 in the radial direction Y is the first end distance. Correspondingly, when the battery cell 7 is at 0% SOC, the volume swelling of the negative electrode active material is relatively small. In this case, the distance between the outer surface of the end region 122 and the inner surface 212*b* of the side wall 212 in the radial direction Y is the second end distance. When the difference between the first end distance and the second end distance is within the above range, the battery cell 7 has a small degree of volume swelling in a charging process. This helps enhance the structural stability and improve the use reliability of the battery cell 7.

For example, the difference between the first end distance and the second end distance is less than or equal to 0.05 mm, for example, 0.05 mm, 0.045 mm, 0.04 mm, 0.035 mm, 0.03 mm, 0.025 mm, 0.02 mm, 0.015 mm, 0.01 mm, 0.005 mm, or 0, or a range defined by any two of the foregoing values.

The difference between the first end distance and the second end distance can be calculated by measuring the distances between a same position in the end region 122 and the side wall 212 at different states of charge. Furthermore, multiple distances between multiple positions in the end region 122 and the side wall 212 at different states of charge can be measured, and the average value of the differences in the multiple distances can be taken as the difference between the first end distance and the second end distance. For example, the difference in the distances between the first position in the end region 122 and the side wall 212 at different states of charge is measured as the first distance, the difference in the distances between the second position in the end region 122 and the side wall 212 at different states of charge is measured as the second distance, and the average value of the first distance and the second distance is the difference between the first end distance and the second end distance.

In some embodiments, an absolute value of the difference between the first middle distance and the second middle distance is a middle variable, and an absolute value of the difference between the first end distance and the second end distance is an end variable, where an absolute value of a difference between the middle variable and the end variable is less than or equal to 0.05 mm.

When the absolute value of the difference between the middle variable and the end variable is within the above range, the difference in volume swelling between the end region 122 and the middle region 121 of the battery cell 7 in the charging process is small, which enables a small overall volume swelling difference in the main body 12, reducing the likelihood of local excessive compression of the housing 20, and significantly enhancing the use reliability of the battery cell 7.

For example, the absolute value of the difference between the middle variable and the end variable is less than or equal to 0.05 mm, for example, 0.05 mm, 0.045 mm, 0.04 mm, 0.035 mm, 0.03 mm, 0.025 mm, 0.02 mm, 0.015 mm, 0.01 mm, 0.005 mm, or 0, or a range defined by any two of the foregoing values.

As a specific embodiment of this application, as shown in FIGS. 4 to 7, the battery cell 7 includes a housing 20 and an electrode assembly 10 accommodated in the housing 20, where the housing 20 includes a side wall 212, and the side wall 212 surrounds the electrode assembly 10; the electrode assembly 10 includes a main body 12, the main body 12 includes a middle region 121 and two end regions 122 arranged along its axial direction X, and the middle region 121 is located between the two end regions 122; and the side wall 212 includes a first part 2121 and a second part 2122 arranged along the axial direction X, the first part 2121 is opposite to the middle region 121 in the radial direction Y, the second part 2122 protrudes in the radial direction Y from a surface of the first part 2121 facing the main body 12, and the second part 2122 is opposite to the end region 122 in the radial direction Y; where in the radial direction Y of the main body 12, a distance between an outer surface of the middle region 121 and an inner surface **212*b* of the side wall 212 is greater than a distance between an outer surface of the end region 122 and the inner surface 212*b* of the side wall 212. A distance between an inner surface 212*b* of the first part 2121 and the outer surface of the middle region 121 is larger, reserving more swelling space for the middle region 121. This is conducive to reducing the risk of the middle region 121 compressing the housing 20 and enhances the use reliability of the cylindrical battery cell 7**.

As another specific embodiment of this application, as shown in FIG. 8, the battery cell 7 includes a housing 20 and an electrode assembly 10 accommodated in the housing 20, where the housing 20 includes a side wall 212, and the side wall 212 surrounds the electrode assembly 10; the electrode assembly 10 includes a main body 12, the main body 12 includes a middle region 121 and two end regions 122 arranged along its axial direction X, and the middle region 121 is located between the two end regions 122; and the inner surface **212*b* of the side wall 212 is an arched surface, and concaves toward a direction leaving the electrode assembly 10; and the side wall 212 may have a uniform thickness; where in the radial direction of the main body 12, a distance between an outer surface of the middle region 121 and the inner surface 212*b* of the side wall 212 is greater than a distance between an outer surface of the end region 122 and the inner surface 212*b* of the side wall 212. The distance between the inner surface 212*b* of the side wall 212 and the outer surface of the middle region 121 is larger, reserving more swelling space for the middle region 121. This is conducive to reducing the risk of the middle region 121 compressing the housing 20 and enhancing the use reliability of the battery cell 7**.

EXAMPLES

Content disclosed in the embodiments of this application is described in detail in the following examples. These examples are merely for illustrative purposes because various modifications and changes made without departing from the scope of the content disclosed in the embodiments of this application are apparent to persons skilled in the art. Unless otherwise stated, all parts, percentages, and ratios reported in the following examples are based on mass, all reagents used in the examples are commercially available or synthesized in a conventional manner, and can be used directly without further treatment, and all instruments used in the examples are commercially available.

Example 1

1. Preparation of Positive Electrode Plate

The positive electrode plate included a positive electrode current collector and a positive electrode film layer. The positive electrode film layer was located on two sides of the positive electrode current collector. The positive electrode current collector was an aluminum foil. The positive electrode film layer was a film layer formed by evenly applying a positive electrode slurry (with a solvent being N-methylpyrrolidone NMP) onto a surface of the positive electrode current collector aluminum foil, followed by drying and cold pressing. The positive electrode film layer included a positive electrode active material, conductive agent carbon black (Super P), and binder polyvinylidene fluoride (PVDF) at a weight ratio of 97:1:2.

The positive electrode active material included a layered transition metal oxide with a molecular formula $LiNi_{0.8}Co_{0.1}Mn_{0.1}O_2$ (NCM811).

2. Preparation of Negative Electrode Plate

The negative electrode plate included a negative electrode current collector and a negative electrode film layer. The negative electrode film layer was located on two sides of the negative electrode current collector. The negative electrode current collector was a copper foil. The negative electrode film layer was a film layer formed by evenly applying a negative electrode slurry (with a solvent being deionized water) on a surface of the negative electrode current collector copper foil, followed by drying and cold pressing. The negative electrode film layer included a silicon-based material (specifically silicon oxide), graphite, conductive agent carbon black, conductive agent carbon nanotubes, and binder polyacrylic acid at a weight ratio of 12.6:82.4:1.9:0.1:3.

The negative electrode film layer had a surface density of 9.0 mg/cm$^2$, a porosity of 22.1%, and a compacted density of 1.7 g/cm$^3$.

3. Separation Film

The separation film was a polypropylene PP film layer.

4. Preparation of Electrolyte

The electrolyte included an organic solvent and a lithium salt. Ethylene carbonate (EC), ethyl methyl carbonate (EMC), and diethyl carbonate (DEC) were mixed at a volume ratio of 1:1:1 to obtain the organic solvent. Subsequently, sufficiently dried lithium salt $LiPF_6$ was dissolved in the obtained organic solvent to prepare an electrolyte with a lithium salt concentration of 1 mol/L.

5. Preparation of Battery Cell

The positive electrode plate, separation film, and negative electrode plate were stacked in sequence so that the separation film was between the positive electrode plate and the negative electrode plate for separation. The positive electrode plate, separation film, and negative electrode plate were wound to form an electrode assembly. The electrode assembly was placed into a housing of cylindrical structure, which was then dried and filled with an electrolyte, followed by processes such as vacuum packaging, standing, formation, and shaping, to obtain a battery cell. The electrode assembly was a cylindrical structure, and the housing was a cylindrical structure. The housing included a housing body and an end cover, where the housing body included a side wall and an end wall that were integrally formed. The side wall surrounded the electrode assembly, and the end cover and the end wall were opposite to each other along the axial direction of the housing.

Comparative Example 1

The battery cell was prepared using a method similar to that in Example 1, and a difference from Example 1 was that the preparation of the negative electrode plate for Comparative Example 1 included the following steps:

The negative electrode plate included a negative electrode current collector and a negative electrode film layer. The negative electrode film layer was located on two sides of the negative electrode current collector. The negative electrode current collector was a copper foil. The negative electrode film layer was a film layer formed by evenly applying a negative electrode slurry (with a solvent being deionized water) on a surface of the negative electrode current collector copper foil, followed by drying and cold pressing. The negative electrode film layer included graphite, conductive agent carbon black, conductive agent carbon nanotubes, and binder polyacrylic acid at a weight ratio of 95:1.9:0.1:3.

Comparative Example 2

The battery cell was prepared using a method similar to that in Example 1, and a difference from Example 1 was that the electrode assembly was a flat structure and the housing was a rectangular structure. The preparation steps of the battery cell were as follows:

The positive electrode plate, separation film, and negative electrode plate were stacked in sequence so that the separation film was between the positive electrode plate and the negative electrode plate for separation. The positive electrode plate, separation film, and negative electrode plate were wound to form an electrode assembly, where the electrode assembly was a flat structure. The electrode assembly was placed into a housing of a rectangular structure, which was then dried and filled with an electrolyte, followed by processes such as vacuum packaging, standing, formation, and shaping, to obtain a battery cell.

Performance Test

1. Test for Swelling Volume of the Battery Cell

The battery cell in a 0% state of charge was immersed in silicone oil, and its mass was measured as $m_0$.

The battery cell in a 100% state of charge was immersed in silicone oil, and its mass was measured as $m_1$.

Given the density of the silicone oil $\rho_{silicon\ oil}$, the volume change $\Delta V$ of the battery cell between the 100% state of charge and 0% state of charge was: $\Delta V=(m_0-m_1)/\rho_{silicon\ oil}$. $\Delta V$ was used to access the use reliability of the battery cell. A smaller value of $\Delta V$ indicates smaller volume swelling of the battery cell and higher use reliability. A larger value of $\Delta V$ indicates greater volume swelling of the battery cell and lower use reliability.

2. Test for Energy Density of the Battery Cell

At a constant voltage (4.25V for both the examples and the comparative examples), the energy density was calculated as the product of the first cycle discharge capacity (Ah) and the discharge voltage, divided by the mass of the battery cell.

Energy density=first cycle discharge capacity (Ah)×discharge voltage (4.25V)/mass of the battery cell (kg).

The first cycle discharge capacity was tested as follows: At 45° C., the prepared battery cell was fully charged at 1C, then fully discharged at 1C. This constituted one charge-discharge cycle. The discharge capacity at this time was recorded as the first cycle discharge capacity.

Test results are shown in Table 1.

TABLE 1

| Item | Negative electrode film layer: Mass percentage of element silicon (%) | Negative electrode film layer: Capacity surface density (mAh/cm$^2$) | Housing Side wall: Material | Housing Side wall: Thickness | Battery cell performance: Energy density (Wh/Kg) | Battery cell performance: Swelling volume (mL) |
|---|---|---|---|---|---|---|
| Comparative Example 1 | 0 | 3.15 | Steel | 0.5 mm | 230 | 0.12 |

TABLE 1-continued

| Item | Negative electrode film layer: Mass percentage of element silicon (%) | Negative electrode film layer: Capacity surface density (mAh/cm$^2$) | Housing Side wall: Material | Housing Side wall: Thickness | Battery cell performance: Energy density (Wh/Kg) | Battery cell performance: Swelling volume (mL) |
|---|---|---|---|---|---|---|
| Comparative Example 2 | 8% | 4.14 | Steel | 0.5 mm | 245 | 0.73 |
| Example 1 | 8% | 4.14 | Steel | 0.5 mm | 245 | 0.28 |

In Table 1, the mass percentage of element silicon refers to its mass percentage in the negative electrode film layer.

As shown in Table 1, compared to Comparative Example 1 and Comparative Example 2, in Example 1, silicon was introduced into the negative electrode active material, which could significantly enhance the energy density of the battery cell. Additionally, due to the cylindrical structure of the housing, the volume swelling of the battery cell was not excessive, and the use reliability of the battery cell remained excellent. When the swelling volume was less than or equal to 0.6 mL, the use reliability of the battery cell was generally good. Furthermore, when the swelling volume was less than or equal to 0.57 mL, and further optionally when it was 0.34 mL, the use reliability of the battery cell was further improved.

Example 2-1 to Example 2-5

The battery cell was prepared using a method similar to that in Example 1, and a difference from Example 1 was that the preparation of the negative electrode plate for Example 2-1 to Example 2-5 included the following steps:

The negative electrode plate included a negative electrode current collector and a negative electrode film layer. The negative electrode film layer was located on two sides of the negative electrode current collector. The negative electrode current collector was a copper foil. The negative electrode film layer was a film layer formed by evenly applying a negative electrode slurry (with a solvent being deionized water) on a surface of the negative electrode current collector copper foil, followed by drying and cold pressing. The negative electrode film layer included a silicon-based material (specifically silicon oxide), graphite, conductive agent carbon black, conductive agent carbon nanotubes, and binder polyacrylic acid. The mass percentage and capacity surface density of element silicon were also adjusted.

Example 3-1 to Example 3-4

The battery cell was prepared using a method similar to that in Example 1, and a difference from Example 1 was that the thickness of the side wall was adjusted in Example 3-1 to Example 3-4.

Example 4

The battery cell was prepared using a method similar to that in Example 1, and a difference from Example 1 was that the material of the side wall was adjusted in Example 4.

Performance Test

The swelling volume and energy density of the battery cell were tested using the methods described in Example 1.

3. Test for Cycling Performance of the Battery

At 45° C., the prepared battery cell was fully charged at 1C, then fully discharged at 1C. This constituted one charge-discharge cycle. The discharge capacity at this time was recorded as the first cycle discharge capacity. The battery cell was subjected to charge-discharge cycling tests according to the aforementioned method. The discharge capacity after each cycle was recorded until the discharge capacity of the battery cell decayed to 80% of the initial discharge capacity. The number of cycles at this point was used to characterize the cycling performance of the battery cell. A higher number of cycles indicates better cycling performance of the battery cell.

Test results are shown in Table 2.

TABLE 2

| Item | Negative electrode film layer: Mass percentage of element silicon (%) | Negative electrode film layer: Capacity surface density (mAh/cm$^2$) | Housing Side wall: Material | Housing Side wall: Thickness | Battery cell performance: Cycles at 45° C. | Battery cell performance: Energy density (Wh/Kg) | Battery cell performance: Swelling volume (mL) |
|---|---|---|---|---|---|---|---|
| Example 1 | 8% | 4.14 | Steel | 0.50 mm | 1400 | 245 | 0.28 |
| Example 2-1 | 2% | 3.33 | Steel | 0.50 mm | 1800 | 234 | 0.17 |
| Example 2-2 | 6% | 3.96 | Steel | 0.50 mm | 1500 | 242 | 0.22 |
| Example 2-3 | 13% | 4.86 | Steel | 0.50 mm | 1000 | 265 | 0.34 |
| Example 2-4 | 19% | 5.76 | Steel | 0.50 mm | 800 | 294 | 0.46 |
| Example 2-5 | 32% | 7.56 | Steel | 0.50 mm | 600 | 320 | 0.57 |
| Example 3-1 | 8% | 4.14 | Steel | 0.30 mm | 1250 | 257 | 0.30 |
| Example 3-2 | 8% | 4.14 | Steel | 0.40 mm | 1350 | 249 | 0.29 |

TABLE 2-continued

| Item | Negative electrode film layer: Mass percentage of element silicon (%) | Negative electrode film layer: Capacity surface density ($mAh/cm^2$) | Housing Side wall: Material | Housing Side wall: Thickness | Battery cell performance: Cycles at 45° C. | Battery cell performance: Energy density (Wh/Kg) | Battery cell performance: Swelling volume (mL) |
|---|---|---|---|---|---|---|---|
| Example 3-3 | 8% | 4.14 | Steel | 0.55 mm | 1510 | 242 | 0.25 |
| Example 3-4 | 8% | 4.14 | Steel | 0.60 mm | 1540 | 236 | 0.22 |
| Example 4 | 8% | 4.14 | Aluminum | 0.70 mm | 1400 | 255 | 0.23 |

As shown in Table 2, Examples 2-1 to 2-5 achieved simultaneous adjustments of the capacity surface density by adjusting the mass percentage of element silicon. This, combined with the side wall of a certain thickness, was conducive to improving both the cycling performance and energy density of the battery cell, while minimizing volume swelling of the battery cell. Furthermore, the embodiments of this application were applicable to different silicon-based materials. The combination of different silicon-based materials and side walls with thicknesses ranging from 0.3 mm to 0.9 mm was conducive to enhancing both the cycling performance and energy density of the battery cell, while minimizing volume swelling of the battery cell.

In Examples 3-1 to 3-4, the thickness of the side wall was adjusted, which was conducive to cooperation with the mass percentage of element silicon and is conducive to improving both the cycling performance and energy density of the battery cell, while minimizing volume swelling of the battery cell. Additionally, the embodiments of this application were suitable for side walls made of different materials, such as steel or aluminum. The high mechanical strength of the above metal side walls effectively mitigated the issue of volume swelling and improved both the cycling performance and energy density of the battery cell.

Example 5

The battery cell was prepared using a method similar to that of Example 1, and a difference from Example 1 was that the surface density, porosity, and compacted density of the negative electrode film layer were adjusted in Example 5.

The performance testing methods were conducted according to the test steps in Example 2.

Test results are shown in Table 3.

TABLE 3

| Item | Negative electrode film layer: Surface density ($mg/cm^2$) | Negative electrode film layer: Porosity (%) | Negative electrode film layer: Compacted density ($g/cm^3$) | Battery cell performance: Cycles at 45° C. | Battery cell performance: Energy density (Wh/Kg) | Battery cell performance: Swelling volume (mL) |
|---|---|---|---|---|---|---|
| Example 5 | 10 | 29.2 | 1.60 | 1400 | 235 | 0.24 |

It can be learned from Table 3 that in Example 5, the surface density, porosity, and compacted density of the negative electrode film layer were adjusted, which was conducive to improving both the cycling performance and energy density of the battery cell, while minimizing volume swelling of the battery cell.

Although illustrative embodiments have been demonstrated and described, those skilled in the art should understand that the above embodiments are not to be construed as limiting this application, and that the embodiments may be changed, replaced, and modified without departing from the spirit, principle, and scope of this application.

Although illustrative implementations have been demonstrated and described, those skilled in the art should understand that the foregoing implementations are not to be construed as limiting this application, and that the implementations may be changed, replaced, and modified without departing from the spirit, principle, and scope of this application.

What is claimed is:

1. A battery cell, comprising:

an electrode assembly comprising a negative electrode plate, wherein the negative electrode plate comprises a negative electrode current collector and a negative electrode film layer disposed on at least one side of the negative electrode current collector and containing a negative electrode active material; and a housing accommodating the electrode assembly, wherein the housing comprises a side wall, and the side wall surrounds the electrode assembly;

wherein:

the negative electrode active material comprises element silicon, and the housing is a cylindrical structure;

the negative electrode film layer meets one or more of the following conditions:

(1) a surface density of the negative electrode film layer is less than or equal to 10.5 $mg/cm^2$; and (2) a compacted density of the negative electrode film layer is less than or equal to 1.75 $g/cm^3$;

the electrode assembly comprises a main body, the main body comprises a middle region and two end regions arranged along an axial direction of the housing, and the middle region is located between the two end regions;

in a radial direction of the housing, a distance between an outer surface of the middle region and an inner surface of the side wall is greater than a distance between an outer surface of the end region and the inner surface of the side wall;

a first end distance between the outer surface of the end region and the inner surface of the side wall in the radial direction when the state of charge of the battery cell is 100% is less than a second end distance between the outer surface of the end region and the inner surface of the side wall in the radial direction when the state of charge of the battery cell is 0%; and a difference between the first end distance and the second end distance is less than or equal to 0.05 mm.

2. The battery cell according to claim 1, wherein:

a mass percentage of the element silicon in the negative electrode film layer is 1% to 32%; and/or a capacity surface density of the negative electrode plate is greater than or equal to 3.2 mAh/cm$^2$; and/or a matrix material of the side wall comprises steel, and a thickness of the side wall is 0.3 mm to 0.9 mm.

3. The battery cell according to claim 1, wherein the negative electrode film layer further meets the following condition:

a porosity of the negative electrode film layer is greater than or equal to 10%, and less than 100%.

4. The battery cell according to claim 1, wherein in a direction from the end region to the middle region, the distance between the outer surface of the middle region and the inner surface of the side wall first decreases and then increases.

5. The battery cell according to claim 1, wherein the side wall comprises a first part and a second part arranged along the axial direction, the first part is opposite to the middle region in the radial direction, the second part protrudes in the radial direction from a surface of the first part facing the main body, and the second part is opposite to the end region in the radial direction.

6. The battery cell according to claim 5, wherein in a direction from the middle region to the end region, the distance between the outer surface of the end region and the inner surface of the side wall increases.

7. The battery cell according to claim 5, wherein the second part is configured as two, and the two second parts are respectively located on two sides of the first part along the axial direction.

8. The battery cell according to claim 5, wherein a size of the first part along the axial direction is 0.4 to 0.98 times a size of the side wall along the axial direction.

9. The battery cell according to claim 5, wherein an outer peripheral surface of the side wall is a cylindrical surface.

10. The battery cell according to claim 1, wherein the inner surface of the side wall is an arched surface, and concaves toward a direction leaving the electrode assembly.

11. The battery cell according to claim 10, wherein the side wall has a uniform thickness.

12. The battery cell according to claim 10, wherein in a direction from one of the two end regions to the other end region, the thickness of the side wall first decreases and then increases.

13. The battery cell according to claim 10, wherein the side wall protrudes in a direction leaving the electrode assembly.

14. The battery cell according to claim 1, wherein:

a first middle distance between the outer surface of the middle region and the inner surface of the side wall in the radial direction when a state of charge of the battery cell is 100% is less than a second middle distance between the outer surface of the middle region and the inner surface of the side wall in the radial direction when the state of charge of the battery cell is 0%; and a difference between the first middle distance and the second middle distance is less than or equal to 0.05 mm.

15. The battery cell according to claim 1, wherein an absolute value of a difference between a middle variable and an end variable is less than or equal to 0.05 mm;

the middle variable is an absolute value of a difference between a first middle distance and a second middle distance, wherein:

the first middle distance is a distance between the outer surface of the middle region and the inner surface of the side wall in the radial direction when a state of charge of the battery cell is 100%; and the second middle distance is the distance between the outer surface of the middle region and the inner surface of the side wall in the radial direction when the state of charge of the battery cell is 0%; and the end variable is an absolute value of a difference between a first end distance and a second end distance, wherein:

the first end distance is a distance between the outer surface of the end region and the inner surface of the side wall in the radial direction when the state of charge of the battery cell is 100%; and the second end distance is the distance between the outer surface of the end region and the inner surface of the side wall in the radial direction when the state of charge of the battery cell is 0%.

16. A battery comprising the battery cell according to claim 1.

17. A battery cell, comprising:

an electrode assembly comprising a negative electrode plate, wherein the negative electrode plate comprises a negative electrode current collector and a negative electrode film layer disposed on at least one side of the negative electrode current collector and containing a negative electrode active material; and a housing accommodating the electrode assembly, wherein the housing comprises a side wall, and the side wall surrounds the electrode assembly;

wherein:

the negative electrode active material comprises element silicon, and the housing is a cylindrical structure; and an inner surface of the side wall is an arched surface, and concaves toward a direction leaving the electrode assembly.

18. A battery cell, comprising:

an electrode assembly comprising a negative electrode plate, wherein the negative electrode plate comprises a negative electrode current collector and a negative electrode film layer disposed on at least one side of the negative electrode current collector and containing a negative electrode active material; and a housing accommodating the electrode assembly, wherein the housing comprises a side wall, and the side wall surrounds the electrode assembly;

wherein:

the negative electrode active material comprises element silicon, and the housing is a cylindrical structure;

the electrode assembly comprises a main body, the main body comprises a middle region and two end regions arranged along an axial direction of the housing, and the middle region is located between the two end regions;

in a radial direction of the housing, a distance between an outer surface of the middle region and an inner surface of the side wall is greater than a distance between an outer surface of the end region and the inner surface of the side wall;

a first middle distance between the outer surface of the middle region and the inner surface of the side wall in the radial direction when a state of charge of the battery cell is 100% is less than a second middle distance between the outer surface of the middle region and the inner surface of the side wall in the radial direction when the state of charge of the battery cell is 0%; and a difference between the first middle distance and the second middle distance is less than or equal to 0.05 mm.

* * * * *